United States Patent
Berg et al.

(10) Patent No.: US 9,256,968 B2
(45) Date of Patent: Feb. 9, 2016

(54) METHOD FOR MODELING USING SKETCHES

(75) Inventors: Daniel C. Berg, Holly Springs, NC (US); Michael D. Elder, Durham, NC (US); John E. Swanke, Terryville, CT (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 13/555,155

(22) Filed: Jul. 22, 2012

(65) Prior Publication Data

US 2014/0022257 A1    Jan. 23, 2014

(51) Int. Cl.
*G06T 11/20* (2006.01)
*G06F 9/44* (2006.01)

(52) U.S. Cl.
CPC ............... *G06T 11/206* (2013.01); *G06F 8/10* (2013.01); *G06F 8/34* (2013.01); *G06F 8/38* (2013.01)

(58) Field of Classification Search
None
See application file for complete search history.

(56) References Cited

U.S. PATENT DOCUMENTS

| | | | |
|---|---|---|---|
| 6,804,686 B1* | 10/2004 | Stone | G06F 8/10 |
| 7,096,454 B2* | 8/2006 | Damm | G06F 3/04883 717/104 |
| 7,747,944 B2 | 6/2010 | Gerhard et al. | |
| 7,818,682 B2 | 10/2010 | Brand et al. | |
| 8,365,135 B2* | 1/2013 | Mahoney | G06F 8/34 715/733 |
| 8,589,858 B1* | 11/2013 | Watson | 717/100 |
| 2009/0174661 A1* | 7/2009 | Rubinstein et al. | 345/163 |
| 2010/0077328 A1 | 3/2010 | Berg et al. | |
| 2010/0162208 A1 | 6/2010 | Amid et al. | |
| 2013/0080140 A1* | 3/2013 | Behr | G06F 11/3604 703/21 |
| 2013/0263081 A1* | 10/2013 | Izukura | G06F 8/34 717/104 |

OTHER PUBLICATIONS

Chen, Qi et al. "An E-whiteboard Application to Support Early Design-Stage Sketching of UML Diagrams". Copyright 2001 IEEE. Published in the Proceedings of 2003 IEEE Human-Centric Computing Conference, Auckland, New Zealand, Oct. 2003.

Meyer, Michael et al. "Mondrian: An Agile Information Visualization Framework". Proceedings of ACM Symposium on Software Visualization (SoftVis 2006).

"Rational Software Architect: Agile Modeling using Sketcher". Version 8.0.1. 2011 [online] IBM Software Group. YouTube Sketching with Rational Software Architect. <URL://http://www.youtube.com/user/IBMRational?feature=mhum#p/u/6/8-Rrx1l8rBU>.

* cited by examiner

*Primary Examiner* — Don Wong
*Assistant Examiner* — Shirin Alizadeh
(74) *Attorney, Agent, or Firm* — Erik K. Johnson; Edward Choi

(57) ABSTRACT

Three methods for converting sketch shapes into semantic elements by way of a semantic editor are disclosed. First, a method for conversion of a sketch shape that is part of a nested shape combination, which includes a sketch shape either hosting or nested within a semantic element. Second, a method for conversion of sketch shapes to semantic elements by storing sketch shape names and sketch shape descriptions in correlation with specific semantic elements and properties. The stored correlation is referenced for subsequent sketch shapes names or descriptions that are the same or a subset of the stored sketch shape name or description. Third, a method of conversion of one or more sketch shapes into a semantic template containing a plurality of semantic elements. Each of the one or more sketch shapes is mapped to a specific semantic element within the semantic template.

20 Claims, 22 Drawing Sheets

METHOD FOR MODELING USING SKETCHES

TECHNICAL FIELD

The present invention relates generally to graphical modeling, and more particularly to a method of graphical modeling using sketches.

BACKGROUND

Creating a model or diagram is often the first step when designing a process or deploying a system. A model can be defined as a complete specification of a problem or solution domain from a particular perspective. Ultimately, a model is a logical concept that can be expressed physically as a drawing, for example on a whiteboard or in a modeling tool. Exemplary models include business analysis models, class diagram models, use-case models, design models, deployment models, data models, etc. A model can either be constructed in a formal manner, i.e., with semantic details included, or in an informal manner, i.e., without semantic details. More specifically, as "semantic" pertains to the different meanings of words or symbols, "semantic details" added to a model identify or define concepts in a model. Typically, an initial model or diagram is constructed in an informal manner without tying specific definitions to the model (referred to herein as a "semantic-less model"). This allows the creator to get an idea down on paper while not having to worry about the specific details of his design. A semantic-less model is composed of notational elements. A notational element is an informal element that is used to visually depict a component of a semantic-less model but adds no semantic details. For example, a notational element might be a rectangle drawn as a component of a model. The rectangle might represent that a function or process should take place here, but may not specifically define what the function or process is or how it operates. Several graphical editors, such as Microsoft Visio and PowerPoint, allow users to create models and diagrams without being required to allocate semantic meaning (e.g., defining the process represented by the box in the above example) to each notational element (referred to herein as a "semantic-less editor"). However, without semantics, the model created (or the logical concept defined by the model) can't be validated or used to automatically generate other content. A model with all the logical components clearly defined may be referred to as a "formal" or "semantic" model.

If a user desires to make a formal model or diagram, a graphical semantic editor, such as IBM Rational Rose and PowerDesigner, is used. A model created by a graphical semantic editor is composed of semantic elements. Semantic elements provide the semantic details previously discussed and may be classes, activities, relationships, specific machines, or any descriptive information, and may be depicted as graphically illustrated components of the model. For example, in a system deployment model describing a website, the components would include hardware components such as a web server and an application server, and software components such as a web application and a database. Each of these components are semantic elements of the deployment diagram and may be displayed as an image recognized by the graphical semantic editor as a known component. Taking the example from above where an informal notational element was a rectangle depicting some function or process that should be included; the corresponding semantic element might be a rectangle with a name of a specific and recognizable function. Alternatively, the corresponding semantic element could be any image recognized by the semantic editor as representative of the specific function.

The relationship between various semantic elements, referred to herein as a "semantic relationship", can also be visually depicted. For example, if the web server hosts the web application, the two corresponding semantic elements would have a semantic relationship which may be depicted by the semantic element representing the web application being shown contained within the semantic element representing the web server. A semantic element may, in some embodiments, have a number of semantic properties providing further details. For example, for the semantic element representing a web server, the amount of memory and the speed of the server processor are possible semantic properties of the web server semantic element that can be included in the semantic model by a user if a higher degree of specificity is desired.

Creating semantic models can be more difficult than creating semantic-less models because they force the user to be continually aware of the details of their model. Often, semantic editors force users to pick the exact semantic element and its relationship to another semantic element before it can be added to the model. With regard to the example above, when building a semantic model, the user would need to not only identify the hardware and software components as specific semantic elements (e.g., the web server and the web application), but in addition, the user would need to identify a specific semantic relationship (e.g., the server hosting the application) before the semantic model would be complete.

For most graphical semantic editors, Unified Modeling Language (UML) has become a standard visual modeling language for software specification and design. UML is used to specify, visualize, modify, construct and document the artifacts of an object-oriented software intensive system under development. In other words, for most semantic editors, semantic elements and their corresponding relationships and properties are presented in terms of UML. This can present problems for users wishing to convert a semantic-less model into a semantic model.

A graphical semantic editor may support conversion between semantic and semantic-less models. These hybrid editors typically provide the user with a tool palette of a set number of notational elements or shapes that can be added to a visual depiction of an informal or semantic-less model. In this manner, a user is not forced to sketch each component of a semantic-less model manually. These notational elements or shapes provided by hybrid editors are referred to herein as "sketch shapes". After the informal model is composed, the user is then given the option of converting the entire semantic-less model to a semantic model or converting each individual semantic-less component into a semantic element by filling in the semantic details required to create each semantic element and/or semantic relationship. The sketch shapes can also be given sketch shape names and sketch shape descriptions at the user's discretion, which serve as informal details for each sketch shape. A sketch shape name can be used to identify a specific matching semantic element. A sketch shape name can also be used to identify a category of sketch shapes which correlate to a specific semantic element or category of semantic elements. Additionally, a sketch shape description can be used to identify a category of descriptions which correlate to one or more semantic properties. Once the semantic model is created, the semantic editor stores the semantic-less model and may even create a link to the semantic-less model within the semantic model. Therefore, the user can go back and forth between the semantic-less model and the semantic model at any time.

SUMMARY

Embodiments of the present invention provide three methods for converting sketch shapes into semantic elements using a semantic editor add-on. First, a method for conversion of a sketch shape that is part of a nested shape combination, which includes a sketch shape either hosting or nested within a first semantic element. A computer receives a request to convert the sketch shape into a second semantic element. The computer then determines whether a semantic relationship between the sketch shape and the first semantic element can be created. Based on the semantic relationship determination, the computer converts the sketch shape into the second semantic element.

Second, a method for conversion of sketch shapes to semantic elements by storing sketch shape names and sketch shape descriptions in correlation with specific semantic elements and properties. A computer receives input to display a first sketch shape. The computer then receives input defining a name for the first sketch shape. The computer receives input indicating a semantic element that correlates with the first sketch shape and stores the correlation between the indicated semantic element and the first sketch shape name. The stored correlation is referenced for subsequent sketch shapes names or descriptions that are the same or a subset of the stored sketch shape name or description.

Third, a method of conversion of a plurality of sketch shapes into a semantic template containing a plurality of semantic elements. The computer receives a request to convert a plurality of sketch shapes into a plurality of semantic elements. The computer then receives input mapping each sketch shape to specific semantic elements from the semantic template. The computer then converts each mapped sketch shape into the specific mapped semantic element. The computer creates each semantic element from the semantic template that was not mapped to a sketch shape. The computer then creates semantic relationships between two or more converted or created semantic elements if the semantic relationship existed between the two or more semantic elements in the semantic template.

DETAILED DESCRIPTION

Figure 1:
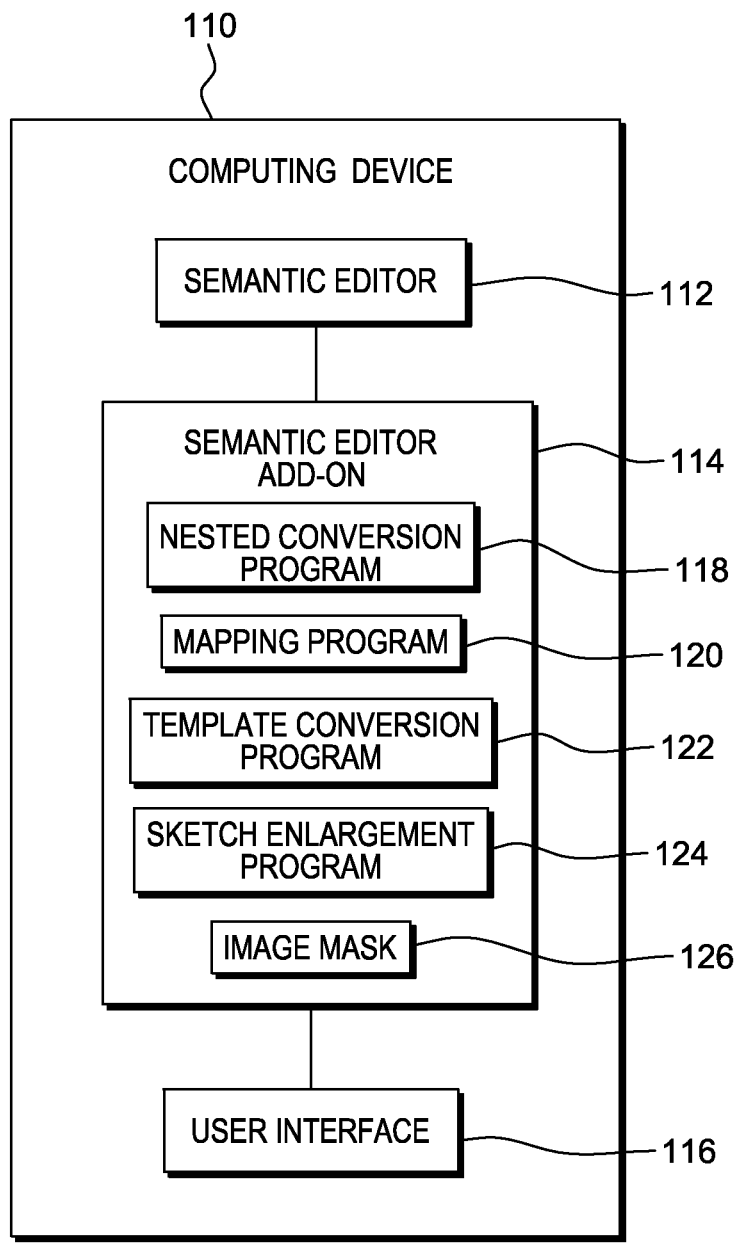
FIG. 1 illustrates a semantic modeling device, in accordance with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-program instructions. These computer-program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer-program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-program instructions may also be loaded onto a computer, other programmable data processing apparatus, or other devices to cause a series of operational steps to be performed on the computer, other programmable apparatus or other devices to produce a computer-implemented process such that the instructions, which execute on the computer, or other programmable apparatus, provide processes for implementing the functions/acts specified in the flowchart and/or block diagram block or blocks.

Embodiments of the present invention will now be described in detail with reference to the accompanying Figures.

FIG. 1 illustrates computing device 110 in accordance with an embodiment of the invention.

Computing Device 110 includes semantic editor 112, semantic editor add-on 114 and user interface 116. Computing device 110 may be a desktop computer, a notebook computer, a laptop computer, a tablet computer, a handheld device, a smart-phone, a thin client, or any other electronic device or computing system capable of receiving input and executing computer-program instructions. Computing device 110 and its components are described in more detail with reference to FIG. 24.

Semantic editor 112 is a program that enables users to view, modify and create semantic or semantic-less models. In a preferred embodiment, semantic editor 112 also allows users to convert back and forth between semantic-less and semantic models. Semantic models created by semantic editor 112 must contain sufficient semantic detail. For example, a semantic model containing one semantic element nested inside another semantic element must clearly define which component each semantic element represents and what the semantic relationship is between the elements. In one example, the nested semantic element can be a software application such as IBM WebSphere, and the host semantic element can be a hard drive, with a hosting semantic relationship defined between the two semantic elements. On the other hand, semantic-less models can be created without any semantic detail. None of the details of the semantic elements or the semantic relationship need to be specified. The semantic-less model can simply show one sketch shape nested inside another sketch shape. The semantic-less model serves as an informal placeholder that can be converted to a semantic model at the discretion of the user. In a preferred embodiment, semantic and semantic-less models created in semantic editor 112 are viewed by a user of computing device 110 via user interface 116.

User interface 116 may receive input from a user and transmit the input to semantic editor 112. User interface 116 uses a combination of technologies and devices, such as device drivers, to provide a platform to enable users to interact with semantic editor 112. In a preferred embodiment, user interface 116 provides a display window and can receive input from a user, such as input indicating selections within the display window. User interface 116 communicates these selections to semantic editor 112 and may subsequently display them to the user.

Semantic editor add-on 114 operates in conjunction with semantic editor 112 to add extra functionality for conversion of sketch shapes to semantic elements and modification of models and their components. These functionalities are represented by nested conversion program 118 which converts nested shape combinations, (a sketch shape nested inside a semantic element or vice versa), to semantic elements; mapping program 120 which maps sketch shape names and descriptions to semantic elements; template conversion program 122 which converts one or more sketch shapes to a predefined set of semantic elements; sketch enlargement program 124 which dynamically replaces enlarged simple and complex sketch shapes with matching sketch shapes that have clearer and sharper borders; and image mask program 126 which dynamically creates image masks, (a group of pixels that define the border of an image), for sketch shapes. While semantic editor add-on 114 and its respective functionalities are shown as separate components, in other embodiments, they can be fully integrated with semantic editor 112.

Figure 2A:
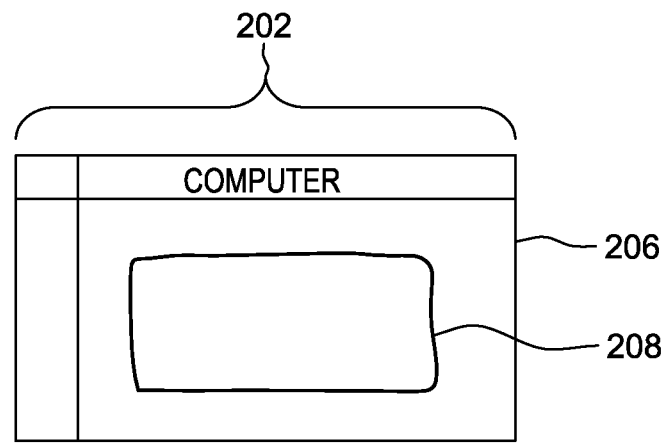
FIGS. 2A and 2B illustrate two nested shape combinations, in accordance with an embodiment of the invention.
Figure 2B:
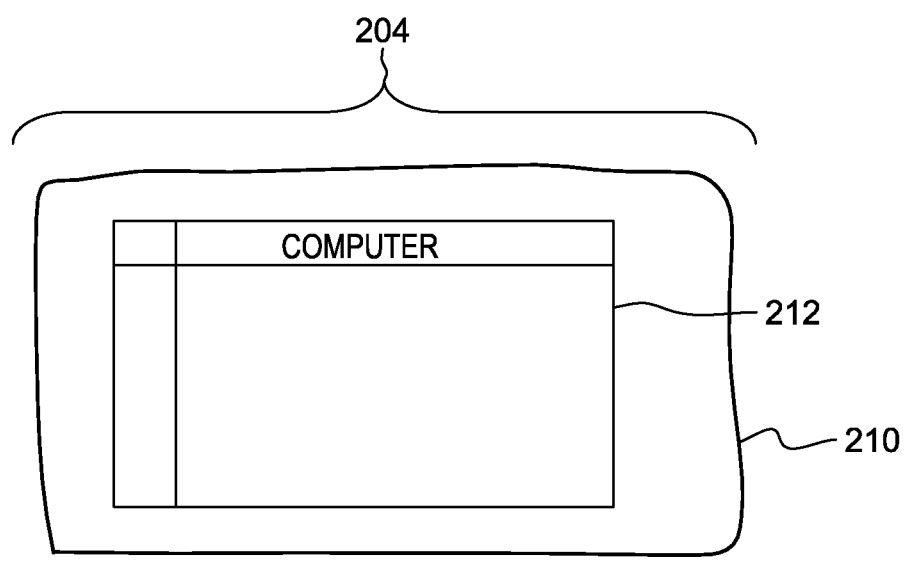

FIGS. 2A and 2B each illustrate a nested shape combination, in accordance with an embodiment of the invention. FIG. 2A depicts nested shape combination 202. Nested shape combination 202 includes sketch shape 208 nested within semantic element 206. In one embodiment, this may represent that a known semantic element, semantic element 206, which in this case is a computer, comprises a component, though the user has not yet clearly defined such component. Therefore, the user creates sketch shape 208 to serve as a placeholder until the user is ready to semantically define not only the component, i.e., sketch shape 208, but the relationship between the component and the known semantic element, i.e., semantic element 206. Creating sketch shape 208 inside of semantic element 206 can be helpful if the user wants to include a component within semantic element 206 but doesn't have the details of the component yet.

FIG. 2B depicts nested shape combination 204. Nested shape combination 204 includes semantic element 212 nested within sketch shape 210. In one embodiment, this may represent that a known semantic element, semantic element 212, which in this case is a computer, is hosted or is a member of a system, though the user has not yet clearly defined such a system. Once again, the user creates sketch shape 210 to serve as a placeholder until the user is ready to semantically define not only the system, but the relationship between the system and the known semantic element, semantic element 212.

In other embodiments, a nested shape combination may be multiple semantic elements nested within a single sketch shape or vice versa. In other embodiments, nesting may occur across multiple levels. For example, a nested shape combination may be a sketch shape or semantic element nested within a sketch shape or semantic element while also serving as a nest for a sketch shape or semantic element.

Figure 3:
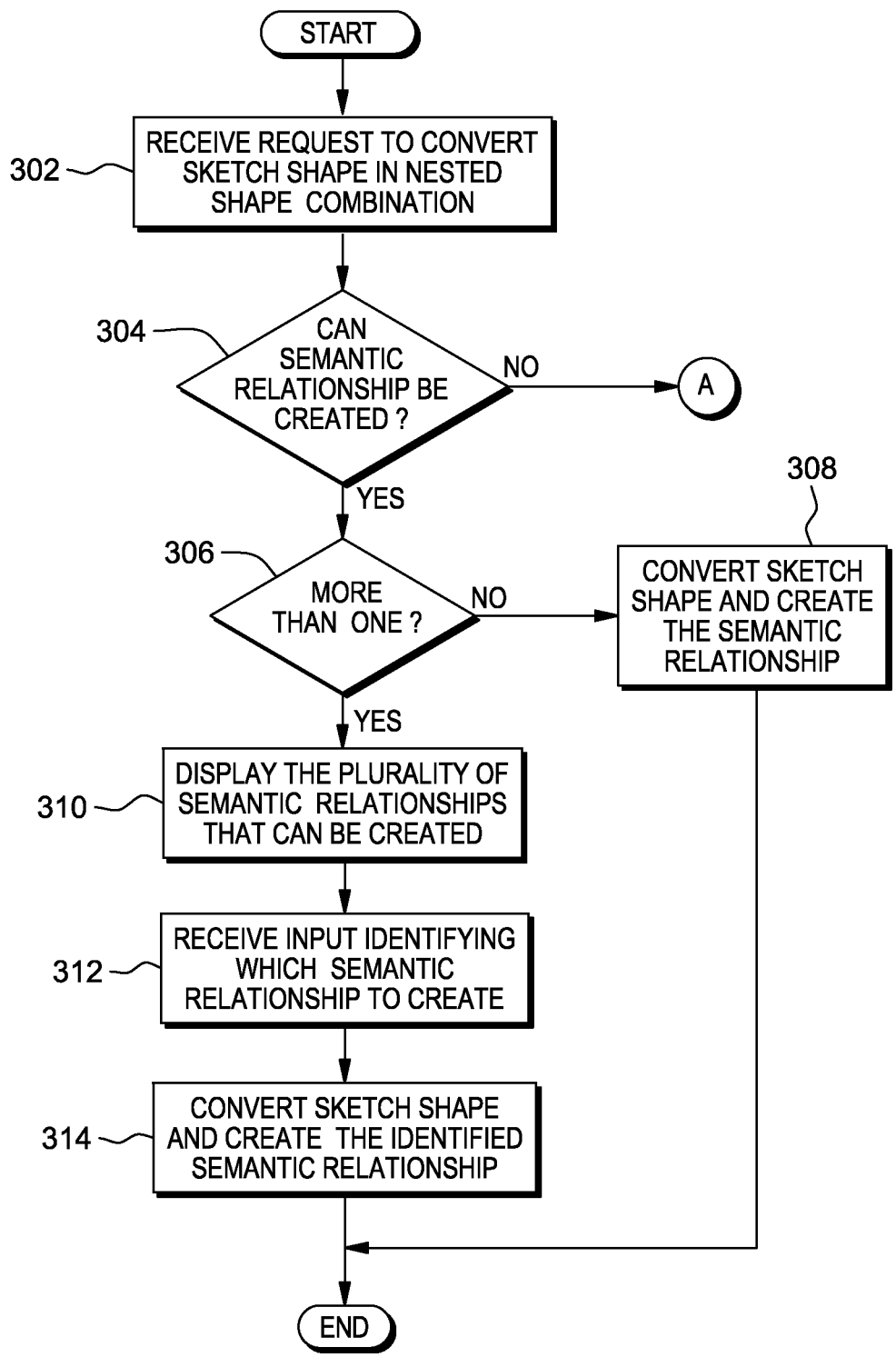
FIG. 3 is a flowchart illustrating the steps of converting either of the two nested shape combinations into semantic elements, in accordance with an embodiment of the invention.
Figure 4:
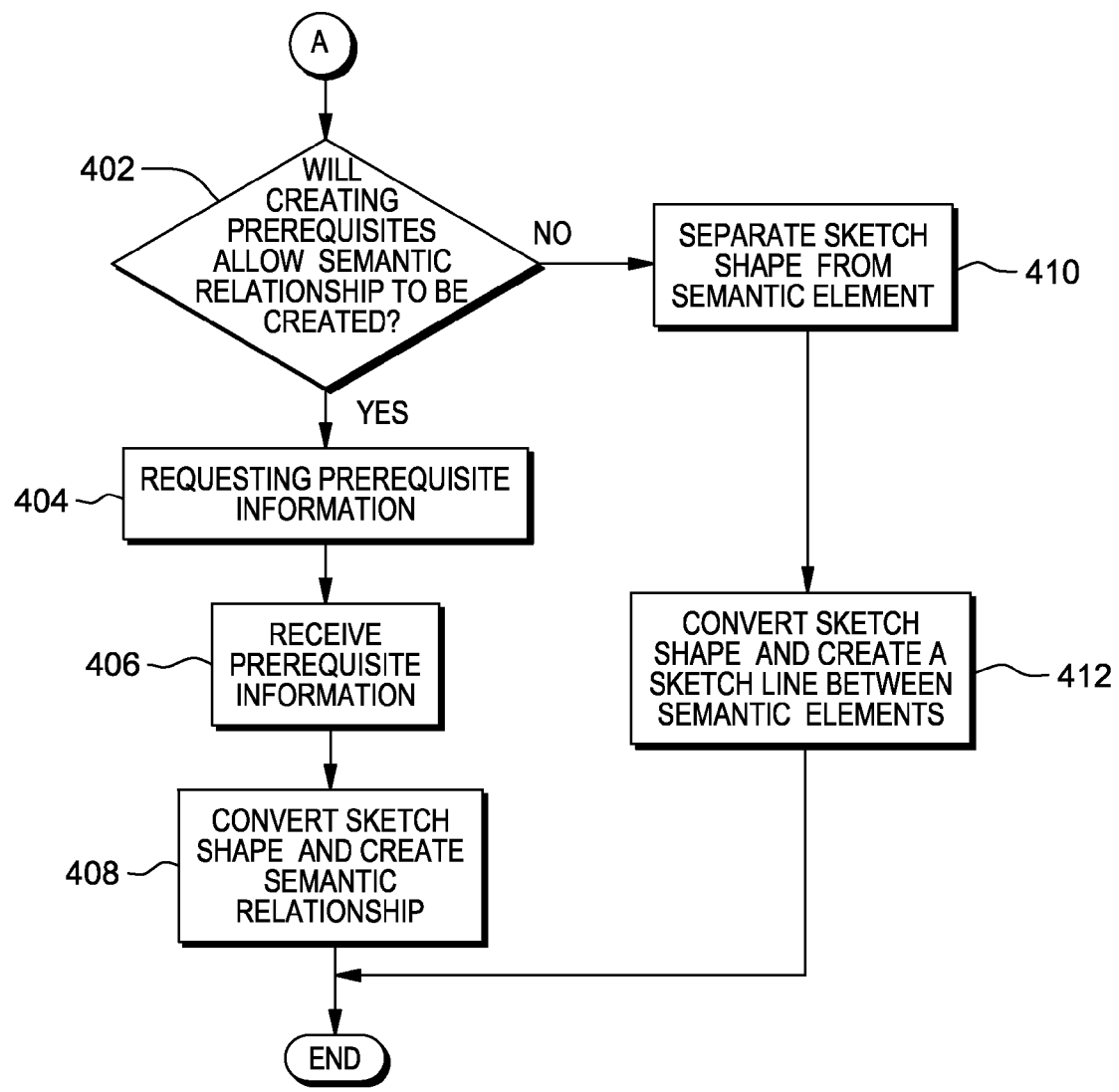
FIG. 4 is a flowchart illustrating the steps of converting either of the two nested shape combinations into semantic elements when no semantic relationship can be created between the shapes within the nested shape combination, in accordance with an embodiment of the invention.

FIGS. 3 and 4 are flowcharts illustrating the steps of nested conversion program 118 converting a sketch shape within a nested shape combination into a semantic element, in accordance with an embodiment of the invention. In a preferred embodiment, nested conversion program 118 receives a request to convert a sketch shape within a nested shape combination into a semantic element (step 302). When designing a sketch shape, as depicted in FIGS. 2A and 2B, a user may insert a sketch shape into a semantic element or vice versa to serve as an indication that another component is needed inside a semantic element or to begin to add semantic detail to a sketch shape (in the case of a semantic element nested within a sketch shape). For example, if a user knows that a particular piece of software will be part of a system model being created, but does not know whether the software will be stored on a computer or an external memory device, the user may create a software semantic element nested within a sketch shape (which represents a storage device to be determined later). Subsequently, when the user is ready to provide the necessary detail, the user may request a conversion of one or more sketch shapes in the model. In the preferred embodiment, the request is transmitted to nested conversion program 118 via input to user interface 116 from an input device such as, a mouse, a keyboard, a touchscreen, voice recognition software, gesture recognition software or a combination of one or more input devices.

Nested conversion program 118 then determines if a semantic relationship can be created between the semantic element the sketch shape is to be converted to and a semantic element that contains or is nested within the sketch shape (decision 304). Nested conversion program 118 contains a plurality of semantic relationships saved in memory. Therefore, nested conversion program 118 determines if there are any saved semantic relationships for a given set of semantic elements existing in memory. For example, with regard to nested shape combination 202, nested conversion program 118 searches through memory to determine if there are any saved semantic relationships between semantic element 206, a computer, and the semantic element sketch shape 208 is to be converted to. If sketch shape 208 is to be converted to a website, nested conversion program 118 searches for any saved semantic relationships existing in memory between the computer semantic element and the website semantic element. Nested conversion program 118 may find one saved semantic relationship (e.g., a hosting relationship); no saved semantic relationships (if there are no saved semantic relationships in memory); or multiple saved semantic relationships. The number of saved semantic relationships nested conversion program 118 is able to find is dependent on the saved semantic relationships configured into semantic editor 112 and the semantic relationships subsequently added into memory by the user.

If a semantic relationship can be created (decision 304, "YES" branch), nested conversion program 118 determines if more than one semantic relationship exists in memory between the semantic element the sketch shape is to be converted to and the semantic element that contains or is nested within the sketch shape (decision 306). If nested conversion program 118 determines only one semantic relationship exists in memory between the aforementioned semantic elements (decision 306, "NO" branch), nested conversion program 118 converts the sketch shape to the appropriate semantic element and the semantic relationship is created between the two semantic elements forming the nested shape combination. For example, with regard to nested shape combination 202, if nested conversion program 118 determines that only a hosting semantic relationship can be created between semantic element 206, which is a computer, and the semantic element sketch shape 208 is to be converted to, which in this example is a website, nested conversion program 118 converts sketch shape 208 into a semantic element and creates the hosting semantic relationship between the two semantic elements. A hosting relationship may be depicted by showing a nested semantic element contained with a host semantic element.

If more than one semantic relationship exists in memory between the semantic element the sketch shape is to be converted to and the semantic element that contains or is nested within the sketch shape (decision 306, "YES" branch), nested conversion program 118 may, in one embodiment, display the plurality of semantic relationships that can be created in a dialog box (step 310). Nested conversion program 118 then receives input from the user identifying which semantic relationship to create (step 312). Nested conversion program 118 then converts the sketch shape to the semantic element and the identified semantic relationship is created between the two semantic elements (step 314). For example, with regard to nested shape combination 204, if nested conversion program 118 determines that more than one semantic relationship exists in memory between semantic element 212, which is a computer, and the semantic element sketch shape 210 is to be converted to, which, in this example, is a server system, nested conversion program 118 displays the plurality of semantic relationships that can be created in a dialog box. In an exemplary embodiment, a hosting semantic relationship could exist between a computer semantic element nested inside a server system semantic element, i.e., the server system hosts the computer, or a member semantic relationship could exist between the two semantic elements, i.e., the computer is a member of the server system (one of the computers that makes up the server system). The user then selects the desired semantic relationship via the dialog box and nested conversion program 118 converts sketch shape 210 into the server system semantic element. Then nested conversion program 118 creates the selected semantic relationship, which, in an exemplary embodiment, is the member semantic relationship between the server system semantic element and the computer semantic element. Typically, there is a visual difference between two semantic elements that have a hosting semantic relationship versus two semantic elements that have a member semantic relationship. For example, in an exemplary embodiment, a hosting semantic relationship is characterized by an arrow with a double line pointing to the nested semantic element, while a member semantic relationship is characterized by an arrow with a single line bent at a 90 degree angle. The visual differences between these two semantic relationships will be further exemplified with reference to FIG. 5.

Returning to decision 304, if nested conversion program 118 determines that no semantic relationship can be created between the semantic element the sketch shape is to be converted to and the semantic element that contains or is nested within the sketch shape (decision 304, "NO" branch), nested conversion program 118 determines if adding prerequisite information will allow for a semantic relationship to be created (decision 402). If nested conversion program 118 determines adding the prerequisite information to the components of the nested shape combination will allow a semantic relationship to be created (decision 402, "YES" branch), nested conversion program 118 requests the prerequisite information from the user (step 404). Nested conversion program 118 then receives the prerequisite information from the user (step 406), converts the sketch shape to the semantic element and creates the semantic relationship (step 408). For example, with regard to nested shape combination 202, if nested conversion program 118 determines that adding prerequisite information will allow for a hosting semantic relationship to be created between semantic element 206, which is a computer, and the semantic element sketch shape 208 is to be converted to, which in this example is a website, nested conversion program 118 requests the hosting information from the user. Hosting relationships can only be created between two semantic elements if one element has a requirement property (i.e., requirement to be hosted on a computer) the other element has a capability property (i.e., capable of supporting requirement). However, in situations where semantic elements initially don't have these properties and a user desires to depict one element hosting the other, the user may be able to add them via nested conversion program 118. In an exemplary embodiment, nested conversion program 118 displays a dialog box requesting that a requirement property and a capability property be added to the semantic elements that will share the hosting semantic relationship. In the exemplary embodiment, nested conversion program 118 prompts the user to select which semantic element to add the requirement property to and which semantic element to add the capability property to. Since semantic element 206, the computer, is intended by the user to be the host, the user adds the capability property to the computer semantic element and adds the requirement property to the website semantic element. Once the hosting properties have been added, nested conversion program 118 converts sketch shape 208 into the website semantic element and creates a semantic hosting relationship between the computer semantic element and the website semantic element, with the computer semantic element serving as the host.

If nested conversion program 118 determines adding prerequisite information will not allow for a semantic relationship to be created between the elements of a nested shape combination (decision 402, "NO" branch), nested conversion program 118 separates the components of the nested shape combination, i.e., the sketch shape and semantic element, so they are no longer nested (step 410). Nested conversion program 118 then converts the sketch shape into a semantic element and creates a sketch line between the semantic elements (step 412). For example, with regard to nested shape combination 202, if the semantic element sketch shape 208 is to be converted to a "class" semantic element, nested conversion program 118 may not allow a semantic relationship to be created between semantic element 206, which is a computer, and the class semantic element because UML does not allow a semantic relationship to be created between a UML component (computer) and a UML class where one of the two semantic elements are visually depicted as nested or being contained within the other. A class semantic element describes a set of objects that share the same features and constraints. An example of a class could be "art students" where all objects belonging to that class share the same feature of being enrolled in an art course. A user may want to create a nested shape combination including an "art students" semantic element contained within the computer semantic element to depict that the art students are using computers. However, as discussed above, since UML does not allow a semantic relationship to be created between a UML component and a UML class where one of the two semantic elements is nested or contained within the other, nested conversion program 118 separates the components of the nested shape combination, i.e., the computer semantic element and sketch shape 208, so they are no longer nested. Nested conversion program 118 then converts the sketch shape 208 to the "art students" semantic element and creates a sketch line between the computer semantic element and the "art students" semantic element to signify that there is a relationship between the two semantic elements.

Figure 5A:
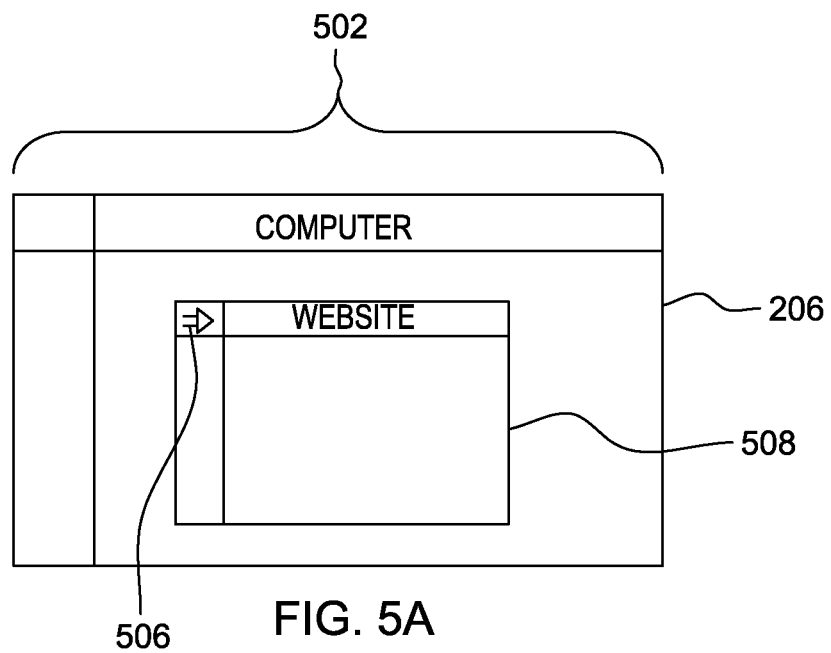
FIGS. 5A and 5B illustrate two nested shape combinations after conversion into semantic form, in accordance with an embodiment of the invention.
Figure 5B:
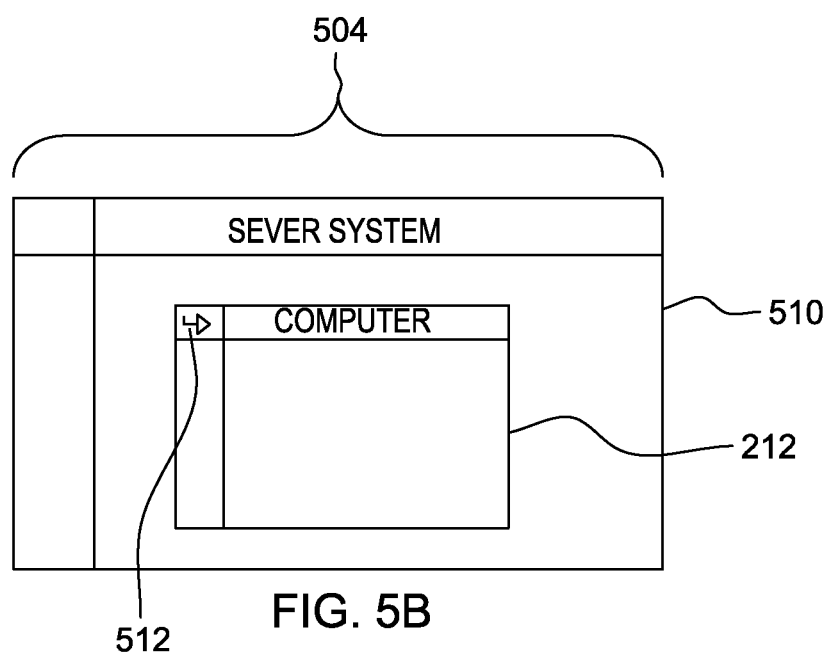

FIGS. 5A and 5B illustrate nested shape combinations 502 and 504 respectively, which represent nested shape combinations 202 and 204, after sketch shape 208 and sketch shape 210 of nested shape combinations 202 and 204 respectively have been converted to semantic elements by nested conversion program 118. Nested shape combination 502 includes semantic element 508 nested within semantic element 206. Nested shape combination 502 exemplifies the end result of the exemplary embodiment (decision 306, "NO" branch), after nested conversion program 118 converts sketch shape 208 to semantic element 508 and creates a hosting semantic relationship between the two semantic elements. Icon 506, an arrow with a double line, visually depicts that the nested semantic relationship that exists between semantic element 206 and semantic element 508 is in fact a hosting semantic relationship. Nested shape combination 504 includes semantic element 212 nested within semantic element 510. Nested shape combination 504 exemplifies the end result of the exemplary embodiment (decision 306, "YES" branch), after nested conversion program 118 converts sketch shape 210 to semantic element 510 and creates a member semantic relationship between the two semantic elements. Icon 512, an arrow with a single line bent at a 90 degree angle, visually depicts that the nested semantic relationship that exists between semantic element 212 and semantic element 510 is a member semantic relationship. As discussed above, illustrating one semantic element nested in another semantic element denotes that a semantic relationship exists between the two elements. It is important to note that, nested conversion program 118 will not allow a sketch shape nested in or containing a semantic element to be converted to a semantic element unless a semantic relationship is created between the semantic element nested in or containing the sketch shape and the semantic element the sketch shape will be converted to. Therefore, with regard to the exemplary embodiment, nested conversion program 118 will not allow nested sketch shape 208 to be converted to semantic element 508 unless a semantic relationship exists or is created between semantic element 206 and semantic element 508.

Figure 6A:
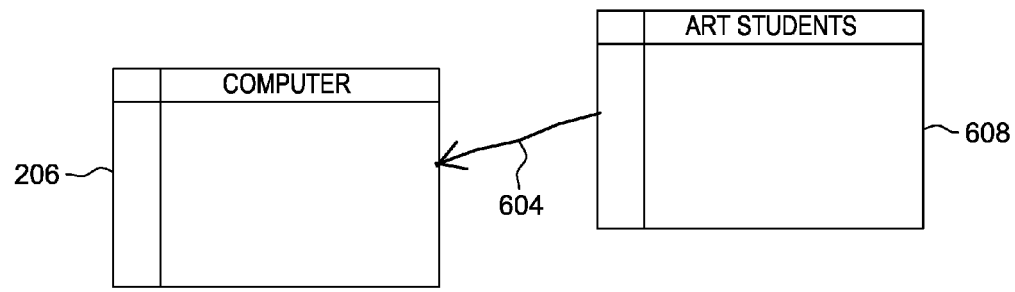
FIGS. 6A and 6B illustrates two outcomes that can occur when one of the two nested shape combinations are converted to semantic elements, in accordance with an embodiment of the invention.

FIG. 6A illustrates a separated version of nested shape combination 202 created by steps 410 and 412, in accordance with an embodiment of the invention. In an exemplary embodiment, with regard to nested shape combination 202, nested conversion program 118 determines if adding prerequisite information will not allow for a semantic relationship to be created between semantic element 206, a computer, and the semantic element sketch shape 208 is to be converted to, i.e., semantic element 608 ("art students"); nested conversion program 118 separates sketch shape 208 and semantic element 206 so they are no longer in a nested form. Nested conversion program 118 then converts sketch shape 208 into semantic element 608 and creates sketch line 604 between semantic element 608 and semantic element 206. Sketch line 604 exemplifies that, although a semantic relationship has not been created, there is an existing relationship between semantic element 608 and semantic element 206. In a preferred embodiment, sketch line 604 points from semantic element 608 to semantic element 206, signifying that semantic element 608 is nested within semantic element 206.

Figure 6B:
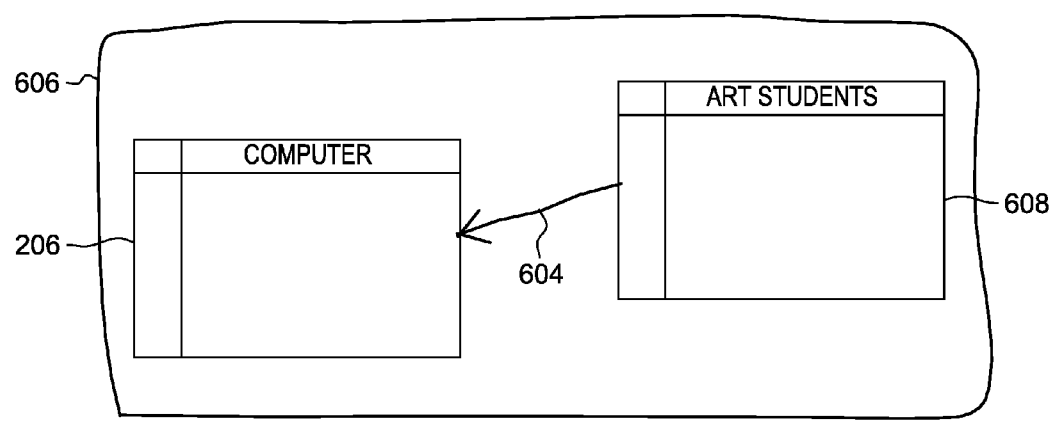

In another embodiment, exemplified by FIG. 6B, sketch shape 606 is created around FIG. 6A to further illustrate an element of containment between semantic element 608 and semantic element 206. Again, in FIG. 6B, sketch line 604 points from semantic element 608 to semantic element 206, signifying that semantic element 608 is nested within semantic element 206. This embodiment adds another sign of containment so there is less confusion as to the nature of the relationship between semantic element 206 and semantic element 608. In a preferred embodiment, in cases where nested conversion program 118 determines adding prerequisite information will not allow for a semantic relationship to be created between the components of a nested shape combination (decision 402, "NO" branch), the user is given the choice between creating a model featuring a containment sketch shape, such as FIG. 6B, or creating a model without a containment sketch shape, such as FIG. 6A.

Figure 7:
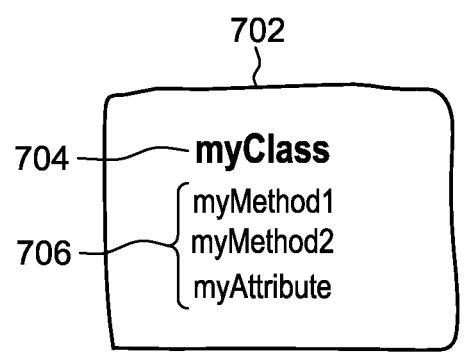
FIG. 7 illustrates a sketch shape that has a sketch shape name and three sketch shape descriptions, in accordance with an embodiment of the invention.

FIG. 7 illustrates sketch shape 702 which includes sketch shape name 704 and sketch shape descriptions 706, in accordance with an embodiment of the invention. Sketch shape name 704 and sketch shape descriptions 706 are created and inputted by a user. As discussed above, a sketch shape name can be used to identify a category of sketch shapes which correlate to the same semantic element or category of semantic elements. A sketch shape description can be used to identify a category of descriptions which correlate to one or more semantic properties. In other words, a user can add a sketch shape description to a sketch shape if the user desires to add further informal details to a sketch shape. The sketch shape description can later be converted to a semantic property when the sketch shape is converted to a semantic element.

Figure 8:
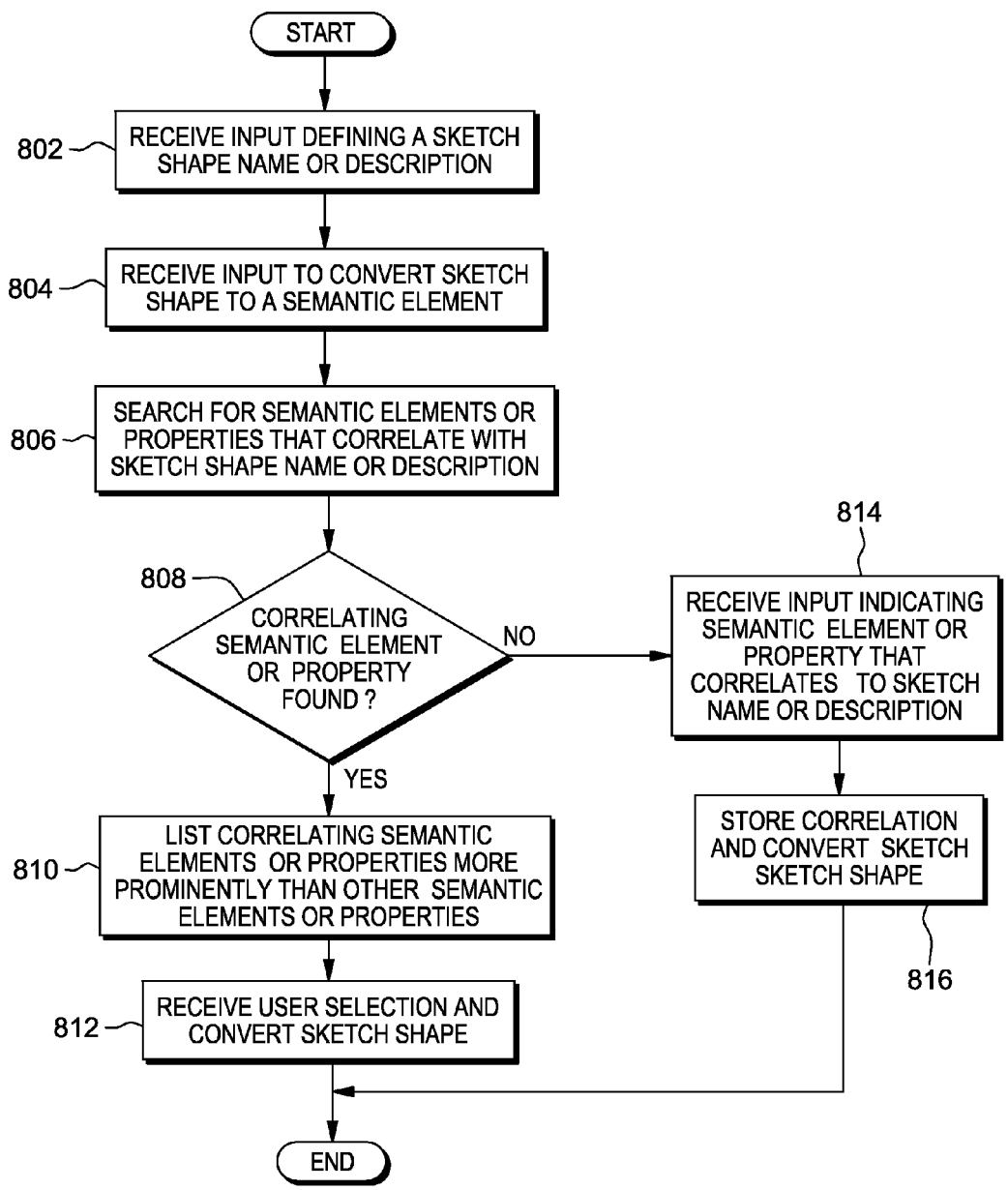
FIG. 8 is a flowchart illustrating the steps of mapping sketch shape names and descriptions to semantic elements, in accordance with an embodiment of the invention.

FIG. 8 is a flowchart illustrating the steps of mapping program 120 mapping sketch shape names to semantic elements and sketch shape descriptions to semantic properties, in accordance with an embodiment of the invention. In a preferred embodiment, mapping program 120 receives input from a user defining a sketch shape name or sketch shape description for a sketch shape (step 802). In an exemplary embodiment, with regard to FIG. 7, mapping program 120 receives sketch shape name 704 and sketch shape descriptions 706 for sketch shape 702 from a user. Mapping program 120 then receives input from the user to convert the sketch shape to a semantic element (step 804). It is important to note that when mapping program 120 converts a sketch shape to a semantic element, any sketch shape descriptions, contained within the sketch shape, are subsequently converted to semantic properties.

Mapping program 120 then searches for semantic elements and properties that correlate to the received sketch shape name or sketch shape description for the sketch shape (step 806). In other words, mapping program 120 searches through stored correlations between sketch shape names/description and semantic elements/properties to determine if there are any semantic elements stored in correlation with sketch shape name 704 or semantic properties stored in correlation with sketch shape descriptions 706 (decision 808). If there is a correlating semantic element(s) found for the sketch shape name or correlating semantic property(s) found for the sketch shape description (decision 808, "YES" branch), the correlating semantic elements or properties may be placed at the top of the semantic conversion list that is displayed in a dialog box by mapping program 120 for the user to select when choosing a semantic element to convert the sketch shape to (step 810). Mapping program 120 then receives the user selection and converts the sketch shape to the chosen semantic element or converts the sketch shape description to the chosen semantic property (step 812). If there is no correlating semantic element or property found for the sketch shape name or description received from the user (decision 808, "NO" branch), mapping program 120 requests and receives input from the user indicating the semantic element to convert the sketch shape to or the semantic property to convert the sketch shape description to (step 814), without the benefit of displaying likely selection candidates more prominently to the user. Mapping program 120 then converts the sketch shape to the user chosen semantic element or the sketch shape description to the user chosen semantic property, and stores the semantic element or property chosen by the user in correlation with the sketch shape name or description for future use (step 816).

Figure 9:
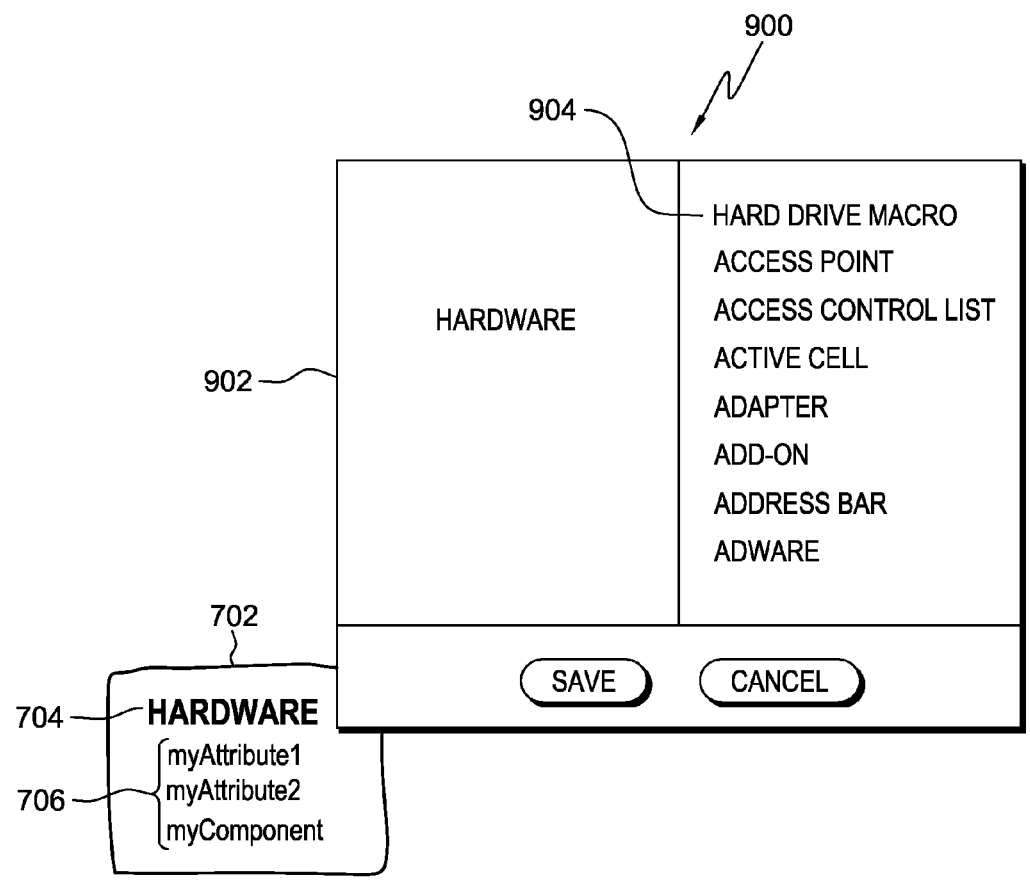
FIG. 9 illustrates conversion screenshot 900 displayed on a computing device, in accordance with an embodiment of the invention.

FIG. 9 illustrates conversion screenshot 900 displayed on a computing device which includes sketch shape 702 from FIG. 7 along with dialog box 902 and semantic element match 904, in accordance with an embodiment of the invention. As discussed above, in the exemplary embodiment, when mapping program 120 searches for semantic elements or properties that correlate to sketch shape name 704 or sketch shape descriptions 706 (step 806), dialog box 902 displays all semantic elements or properties, with the correlating semantic elements or properties, displayed at the top of the list. In this example, mapping program 120 searches for semantic elements that correlate with sketch shape name 704. Dialog box 902 displays all semantic elements with the semantic element(s) stored in correlation with sketch shape name 704, semantic element match 904, displayed at the top of the list. The user can choose to convert sketch shape 702 into the correlating semantic element, semantic element match 904, or choose another semantic element to convert sketch shape 702 to. If another semantic element is chosen, mapping program 120 stores the chosen semantic element in correlation with sketch shape name 704 for future use. Therefore, next time sketch shape name 704 or a subset of the sketch shape name 704 is used, both semantic element match 904 and the new chosen semantic element will appear at the top of the semantic conversion list located in dialog box 902. If semantic element match 904 was not stored in correlation with sketch shape name 704, dialog box 902 would display all semantic elements to the user without any preferential order. The user would choose the desired semantic element and mapping program 120 would then store the chosen semantic element in correlation with sketch shape name 704 so that next time the user wishes to convert sketch shape name 704 or a subset of sketch shape name 704, the chosen semantic element will be displayed by dialog box 902 atop the semantic conversion list.

The same process is repeated for sketch shape descriptions 706. Mapping program 120 searches for semantic properties that correlate with each of the sketch shape descriptions contained within sketch shape descriptions 706, beginning with "myAttribute1". Dialog box 902 displays all semantic properties with the semantic property(s) stored in correlation with the sketch shape description, "myAtrribute1", displayed at the top of the semantic conversion list. The user can choose to either convert the sketch shape description into the correlating semantic property or convert the sketch shape to a different semantic property. If the user chooses a different semantic property, the correlation between the sketch shape description and the different semantic property remains stored for future use. If mapping program 120 is unable to find any semantic properties that are stored in correlation with the sketch shape description, the user once again chooses a semantic property. Mapping program 120 then converts the sketch shape description to the chosen semantic property and stores the chosen semantic property in correlation with the sketch shape description for future use as detailed above. Since the first two sketch shape descriptions contain the same substring, "myAttribute", these two sketch shape descriptions may be considered part of the same category. Therefore, any semantic properties found that correlate with "myAttribute1" also correlate with "myAttribute2".

Figure 10:
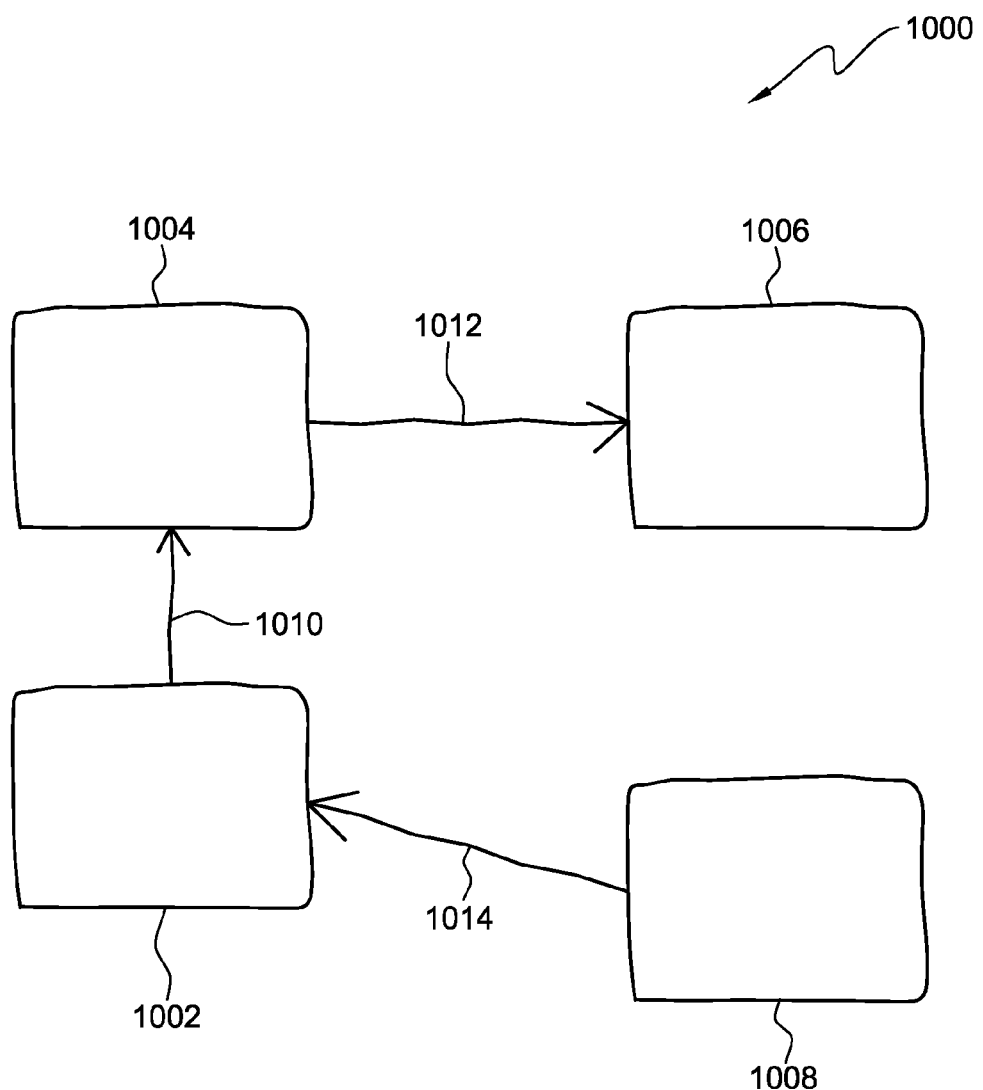
FIG. 10 illustrates a group of sketch shapes, in accordance with an embodiment of the invention.

FIG. 10 illustrates sketch file 1000 which includes sketch shape 1002 and sketch shape 1004, connected by sketch line 1010, sketch shape 1006 connected to sketch shape 1004 by sketch line 1012, and sketch shape 1008 connected to sketch shape 1002 by sketch line 1014. In general, sketch file 1000 represents a semantic-less model. As previously discussed, template conversion program 122 allows for a sketch shape to be converted to a single semantic element. Additionally, template conversion program 122 may also allow for a sketch shape to be converted to a pre-set structure of interrelated semantic elements, herein referred to as a semantic template. Most semantic editors contain at least a few pre-saved semantic templates which illustrate commonly used systems or methods. Template conversion program 122 may also allow for a plurality of sketch shapes to be simultaneously converted to a semantic template.

Figure 11:
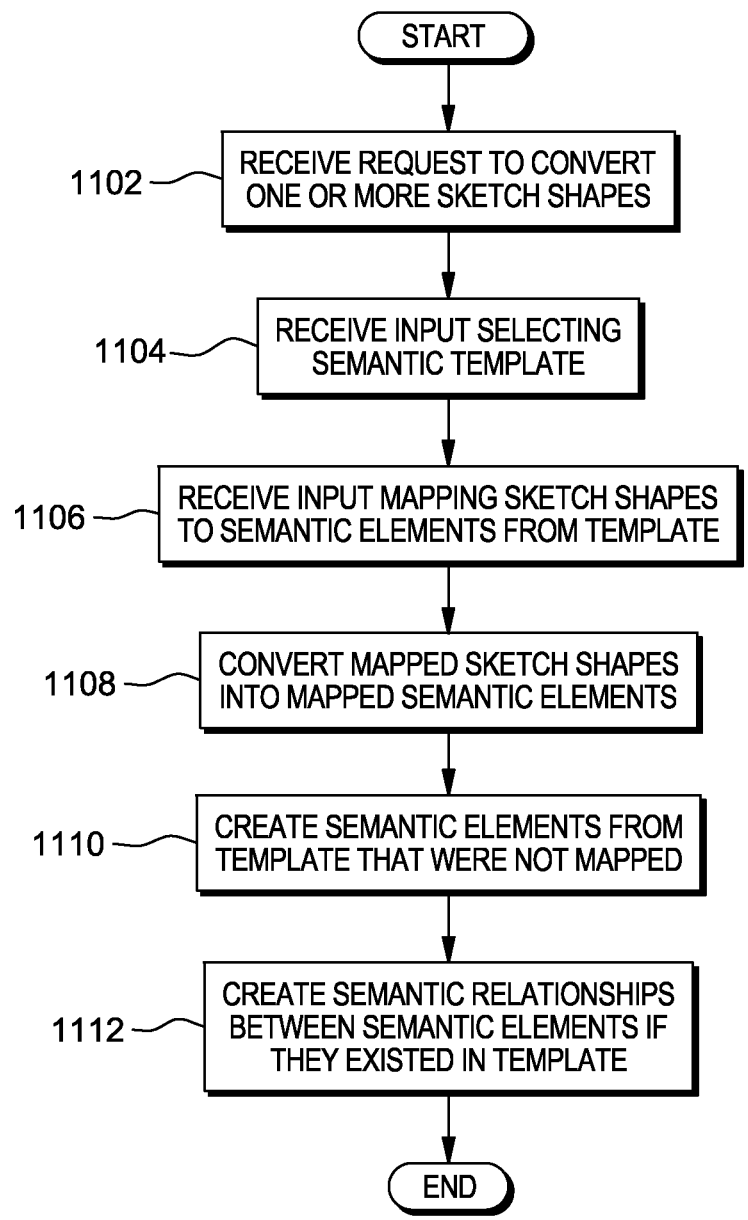
FIG. 11 is a flowchart illustrating the steps of simultaneously converting a plurality of sketch shapes to a semantic template, in accordance with an embodiment of the invention.

FIG. 11 is a flowchart illustrating the steps of simultaneously converting one or more sketch shapes to a semantic template. In a preferred embodiment, template conversion program 122 receives a request to convert one or more sketch shapes into a semantic template, which contains a plurality of semantic elements (step 1102). For example, a user selects sketch shapes 1002, 1004, 1006 and 1008 and requests for conversion of the selected sketch shapes to a semantic template. In response, template conversion program 122 brings up a dialog box listing the selected sketch shapes on the left and a list of semantic templates on the right. Template conversion program 122 then receives input from the user selecting the semantic template to convert the selected sketch shapes to (step 1104).

Template conversion program 122 then receives input from the user mapping each sketch shape to a specific semantic element from the semantic template (step 1106). Template conversion program 122 then converts the mapped sketch shapes into the semantic elements they were mapped to (step 1108).

Template conversion program 122 then creates semantic elements from the semantic template that were not mapped to a sketch shape (step 1110). In other words, if there is a semantic element(s) from the semantic template that was not mapped to a sketch shape, template conversion program 122 goes ahead and creates the semantic element anyway, so the semantic template is not broken up. For example, if two sketch shapes are selected to be converted to a semantic template that contains three semantic elements and each of the two sketch shapes are mapped to a semantic element from the semantic template, template conversion program 122 converts the selected sketch shapes to their mapped semantic elements and also creates the remaining semantic element from the semantic template. Template conversion program 122 then creates the semantic relationships between the newly created semantic elements as they existed in the semantic template (step 1112). These semantic relationships are created regardless of whether a sketch line originally existed between the sketch shapes selected for conversion. For example, with regard to FIG. 10, if sketch shapes 1002 and 1004 are mapped to semantic elements from a semantic template, template conversion program 122 creates a semantic relationship between sketch shape 1002 and sketch shape 1004 only if there is a semantic relationship existing in the semantic template between the semantic elements sketch shape 1002 and sketch shape 1004 are mapped to, regardless of whether sketch line 1010 exists or not. All sketch shapes that are not mapped to a semantic element from the semantic template are left unconverted. Sketch lines that do not represent semantic relationships that exist in the semantic template are also left unconverted.

Figure 12:
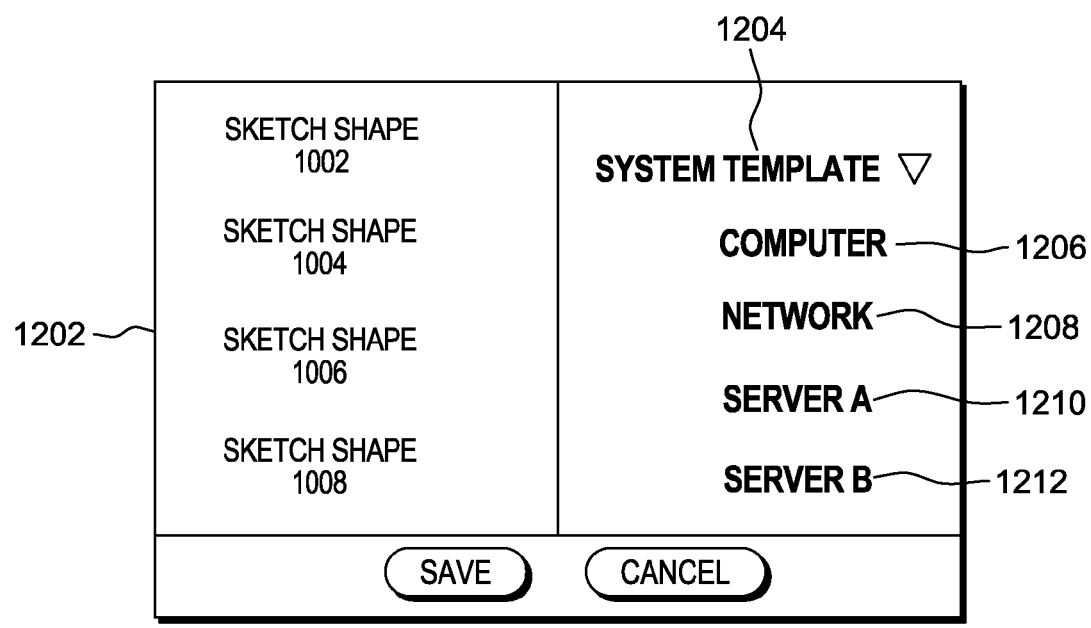
FIG. 12 illustrates dialog box 1202 which is used to map each selected sketch shape to a semantic element from a semantic template, in accordance with an embodiment of the invention.

FIG. 12 illustrates dialog box 1202 which lists selected sketch shapes 1002, 1004, 1006 and 1008 on the left side and semantic template 1204 on the right, which contains four semantic elements: computer 1206, network 1208, server A 1210, and server B 1212. In an exemplary embodiment, a semantic relationship exists between computer 1206 and network 1208, between network 1208 and server A 1210, and between network 1208 and server B 1212. Template conversion program 122 receives input from the user mapping sketch shape 1002 to computer 1206, sketch shape 1004 to network 1208, and sketch shape 1006 to server 1210. Template conversion program 122 then converts each sketch shape to the corresponding mapped semantic element.

Figure 13:
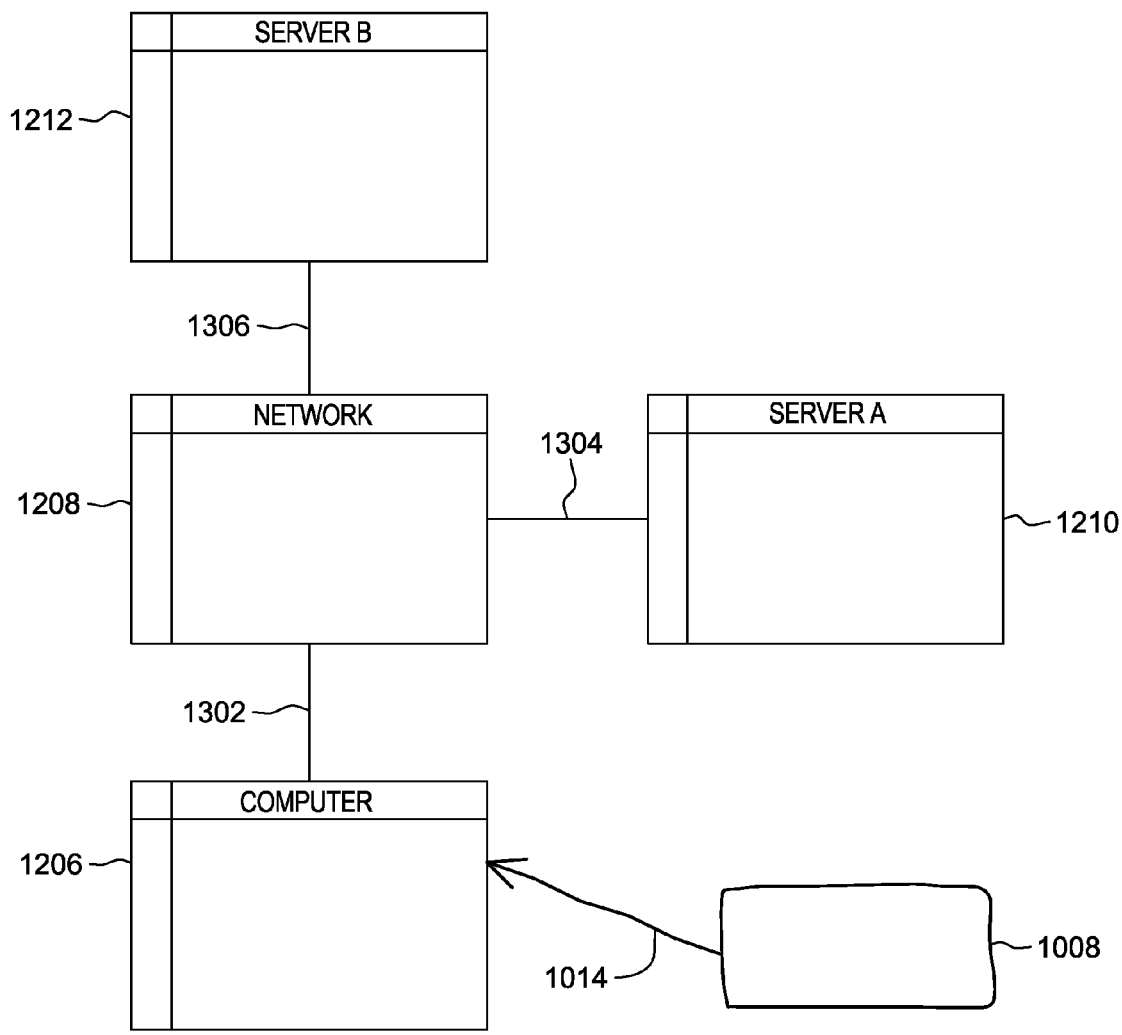
FIG. 13 illustrates sketch file 1000 after sketch shape 1002, 1004 and 1006 have been converted to semantic elements, in accordance with an embodiment of the invention.

FIG. 13 illustrates sketch file 1000 after sketch shape 1002, 1004 and 1006 have been converted to semantic elements, computer 1206, network 1208, and server 1210, respectively. Template conversion program 122 creates semantic element, server B 1212, even though it was not mapped to a sketch shape, because server B 1212 is part of semantic template 1204. Template conversion program 122 also creates semantic relationship 1302 between semantic elements computer 1206 and network 1208, semantic relationship 1304 between semantic elements network 1208 and server A 1210, and semantic relationship 1306 between semantic elements network 1208 and server B 1212, because each of the semantic relationships existed between the aforementioned semantic elements in semantic template 1204. As discussed above, the existence of sketch line 1010 between sketch shapes 1002 and 1004 has no bearing on whether template conversion program 122 creates semantic relationship 1302 between computer 1206 and network 1208. Template conversion program 122 leaves sketch shape 1008 unconverted because it was not mapped to a specific semantic element by the user. Template conversion program also leaves sketch line 1014 unconverted because it does not represent a semantic relationship that exists in the semantic template.

Figure 14:
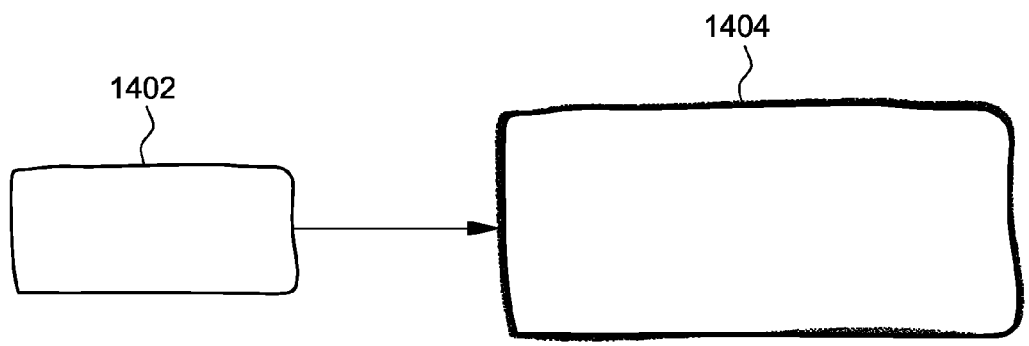
FIG. 14 illustrates a sketch shape being enlarged in size, in accordance with an embodiment of the invention.

FIG. 14 illustrates sketch shape 1402 being enlarged in size, in accordance with an embodiment of the invention. While working with a model, a user may choose to enlarge a sketch shape in order to have room to nest other sketch shapes or semantic elements inside. Sketch shape 1404 represents sketch shape 1402 after it has been resized past a set size threshold value. In a preferred embodiment, sketch shapes are bitmap images created with slightly fuzzy, imperfect borders to simulate the look of a hand drawn image. However, when a sketch shape is enlarged, the flaws and fuzziness of the borders also become enlarged, as shown by sketch shape 1404. On the other hand, when a sketch shape is scaled down, the borders can become so thin they appear invisible, and other detail can be lost.

Figure 15:
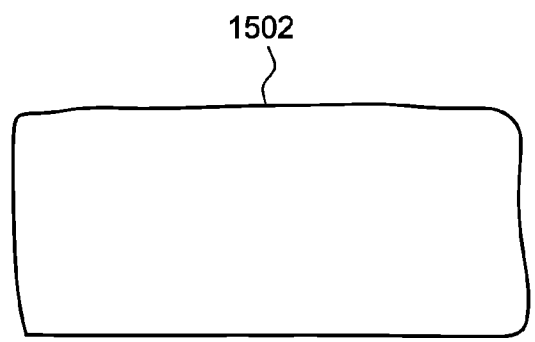
FIG. 15 illustrates a second sketch shape after it has replaced the enlarged sketch shape, in accordance with an embodiment of the invention.

FIG. 15 illustrates sketch shape 1502 which represents a replacement sketch shape for the enlarged sketch shape 1404. As discussed above, when a sketch shape is enlarged, the borders can become fuzzy and unclear. Sketch enlargement program 124 replaces resized sketch shapes with fuzzy or unclear borders, such as sketch shape 1404, with sketch shapes that have clearer borders, such as sketch shape 1502, so a user can enlarge or shrink a sketch shape as desired without having to worry about fuzzy or disappearing borders.

Figure 16:
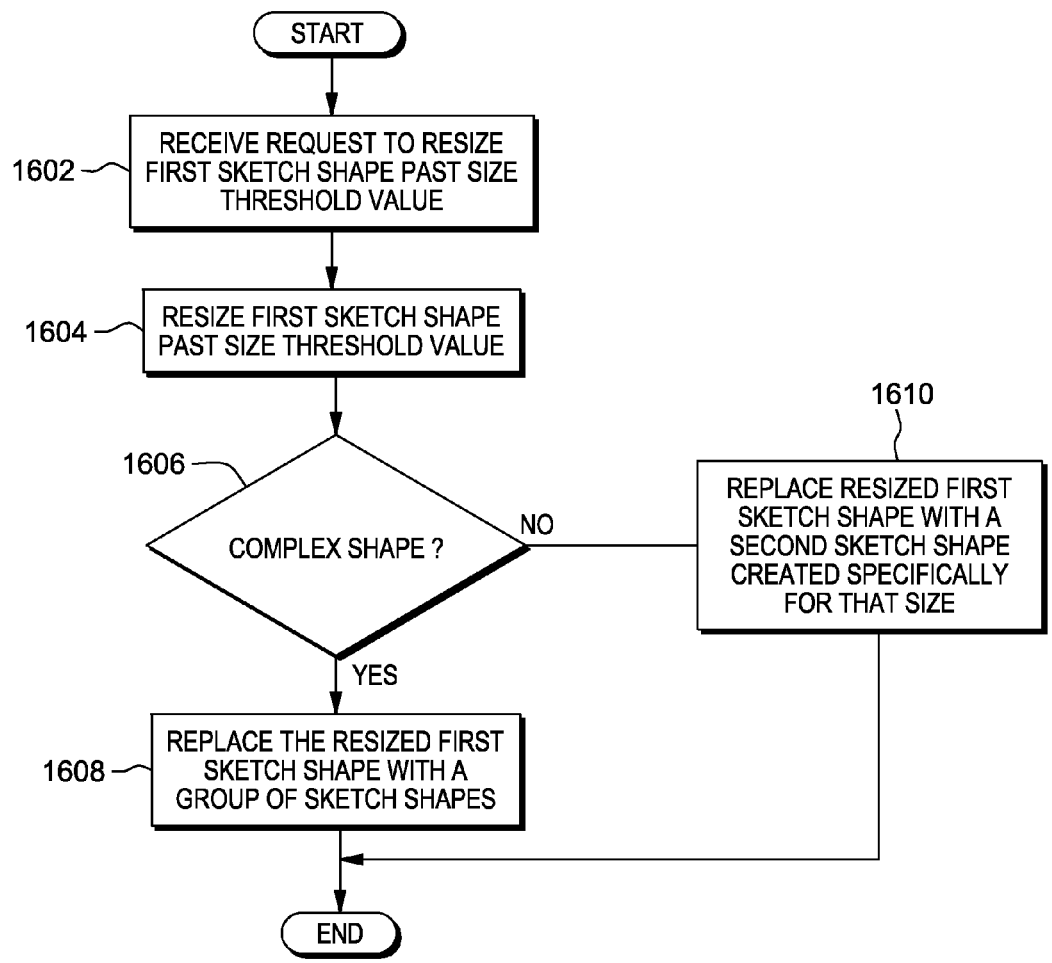
FIG. 16 is a flowchart that illustrates the steps of replacing a resized sketch shape with a second sketch shape, in accordance with an embodiment of the invention.

FIG. 16 is a flowchart that illustrates the operational steps of sketch enlargement program 124 in replacing a resized first sketch shape, such as sketch shape 1404, with a second sketch shape specifically created for that size that has clearer, less fuzzy borders, in accordance with an embodiment of the invention. In a preferred embodiment, sketch enlargement program 124 receives a request to resize a first sketch shape past a set size threshold value (step 1602). In a preferred embodiment, the set size threshold value varies from sketch shape to sketch shape, and represents either an upper or a lower size limit for the sketch shape, where, when passed, the borders of the sketch shape either become fuzzy or disappear, depending on whether the sketch shape is enlarged or minimized. Sketch enlargement program 124 then resizes the first sketch shape past the set size threshold value (step 1604). In an exemplary embodiment, sketch enlargement program 124 receives a request to enlarge sketch shape 1402 past the upper set size threshold value of the sketch shape. Sketch enlargement program 124 then resizes sketch shape 1402 resulting in sketch shape 1404. In another embodiment, the sketch shape could receive a request to resize the first sketch shape to a size that falls under the lower set size threshold value.

Sketch enlargement program 124 then determines if the first resized sketch shape is a complex shape or a simple shape (decision 1606). In a preferred embodiment, sketch enlargement program 124 is configured so that certain sketch shapes are defined as complex shapes, while others are defined as simple shapes. In an exemplary embodiment, sketch enlargement program 124 is configured to define a rectangle is as a simple shape, while a cylinder is defined as a complex shape.

If sketch enlargement program 124 determines that the first resized sketch shape is not a complex shape (decision 1606, "NO" branch), sketch enlargement program 124 replaces the first resized sketch shape with a second matching sketch shape created specifically for that size, that has clearer, more well defined borders (step 1610). For example, sketch shape 1404 is a rectangle, which is defined by sketch enlargement program 124 as a simple shape, i.e., not a complex shape. Therefore, sketch enlargement program 124 replaces sketch shape 1404 with sketch shape 1502, which has clearer, less fuzzy borders.

If sketch enlargement program 124 determines that the first resized sketch shape is a complex shape (decision 1606, "YES" branch), sketch enlargement program 124 replaces the first resized sketch shape with a group of sketch shapes that when put together form a second sketch shape that matches the first resized sketch shape, except with clearer, more well defined borders (step 1608).

Figure 17:
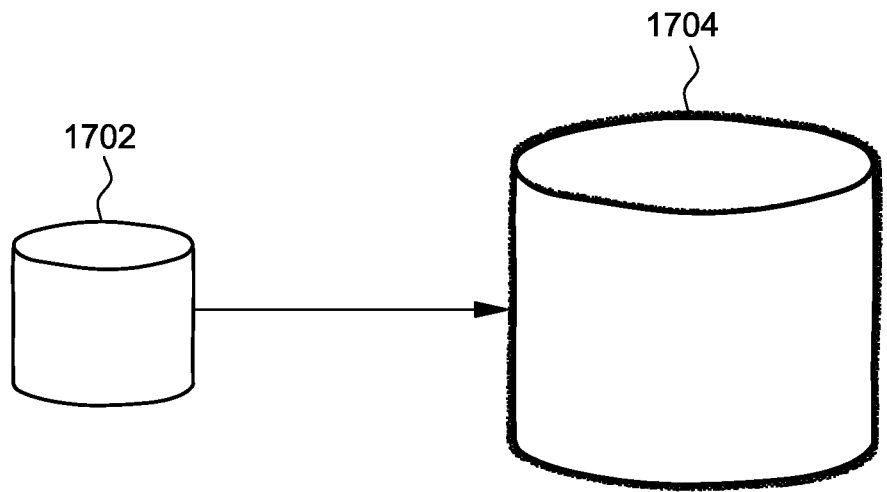
FIG. 17 illustrates a complex sketch shape being enlarged in size, in accordance with an embodiment of the invention.

FIG. 17 illustrates sketch shape 1702 being enlarged in size, in accordance with an embodiment of the invention. Sketch shape 1704 represents sketch shape 1702 after it has been resized past a set size threshold value. Sketch shape 1704 is a cylinder, which is defined by sketch enlargement program 124 to be a complex shape. Therefore, sketch enlargement program 124 replaces sketch shape 1704 with a group of sketch shapes that when put together form a shape that matches sketch shape 1704, except with clear borders.

Figure 18:
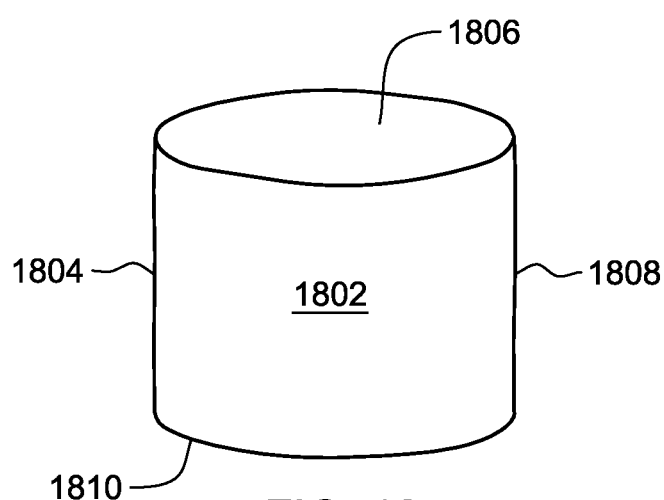
FIG. 18 illustrates a second sketch shape after it has replaced the enlarged complex sketch shape, in accordance with an embodiment of the invention.

FIG. 18 illustrates sketch shape 1802 which represents a replacement sketch shape for the enlarged sketch shape 1704, in accordance with an embodiment of the invention. As discussed above, since sketch shape 1704 is a complex shape, sketch enlargement program 124 combines a group of sketch shapes together to create the replacement sketch shape, sketch shape 1802. Sketch shape 1806 represents the top oval of the cylinder, sketch shape 1804 represents the left edge/line, sketch shape 1808 represents the right edge/line of the cylinder, and sketch shape 1810 represents the bottom curve of the cylinder. Sketch enlargement program 124 combines all four sketch shapes together to form sketch shape 1802.

Figure 19:
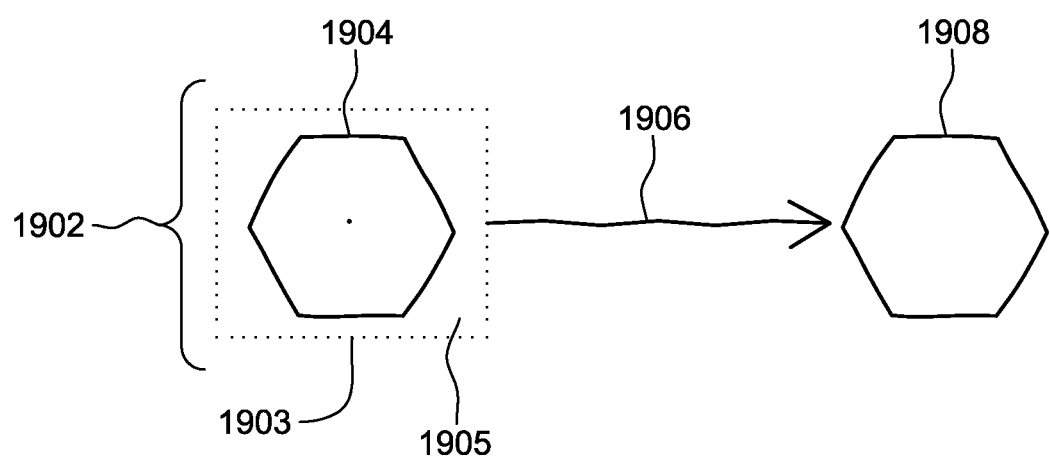
FIG. 19 illustrates a first bitmap image without an image mask connected to a second bitmap image by a line, in accordance with an embodiment of the invention.

When designing graphical models, connecting components or sketch shapes within the model can pose unique problems. FIG. 19 depicts one such scenario. FIG. 19 illustrates a first sketch shape, represented by bitmap image 1902, connected to a second sketch shape, 1908, by sketch line 1906, in accordance with an embodiment of the invention. As discussed above, in a preferred embodiment, sketch shapes are bitmap images created with slightly fuzzy, imperfect borders to simulate the look of a hand drawn image. Bitmap images are made up of individual pixels of color in a grid-like matrix formation. Due to the grid like formation, bitmap images are restricted to rectangular shapes. Bitmap images can appear to take on a different shape by making the surrounding pixels transparent. For example, bitmap image 1902 contains sketch shape 1904 with transparent pixels 1905 filling out the rest of bitmap image 1902's rectangular shape. Rectangle 1903 represents the border of bitmap image 1902. While rectangle 1903 is shown in the figure, it is actually a non-visible border. Some bitmap images contain an image mask, which is a group of pixels that defines the border of the image or sketch shape with the bit map image. An image mask is used, for example, when determining where to terminate a line that is supposed to connect to a displayed sketch shape, e.g., sketch shape 1904. However, bitmap images do not always contain an image mask, which results in a connecting line terminating at the border of the bitmap image surrounding a sketch shape instead of at the sketch shape. For example, sketch line 1906 terminates at the border of bitmap image 1902, i.e., rectangle 1903, instead of at the border of sketch shape 1904.

Figure 20:
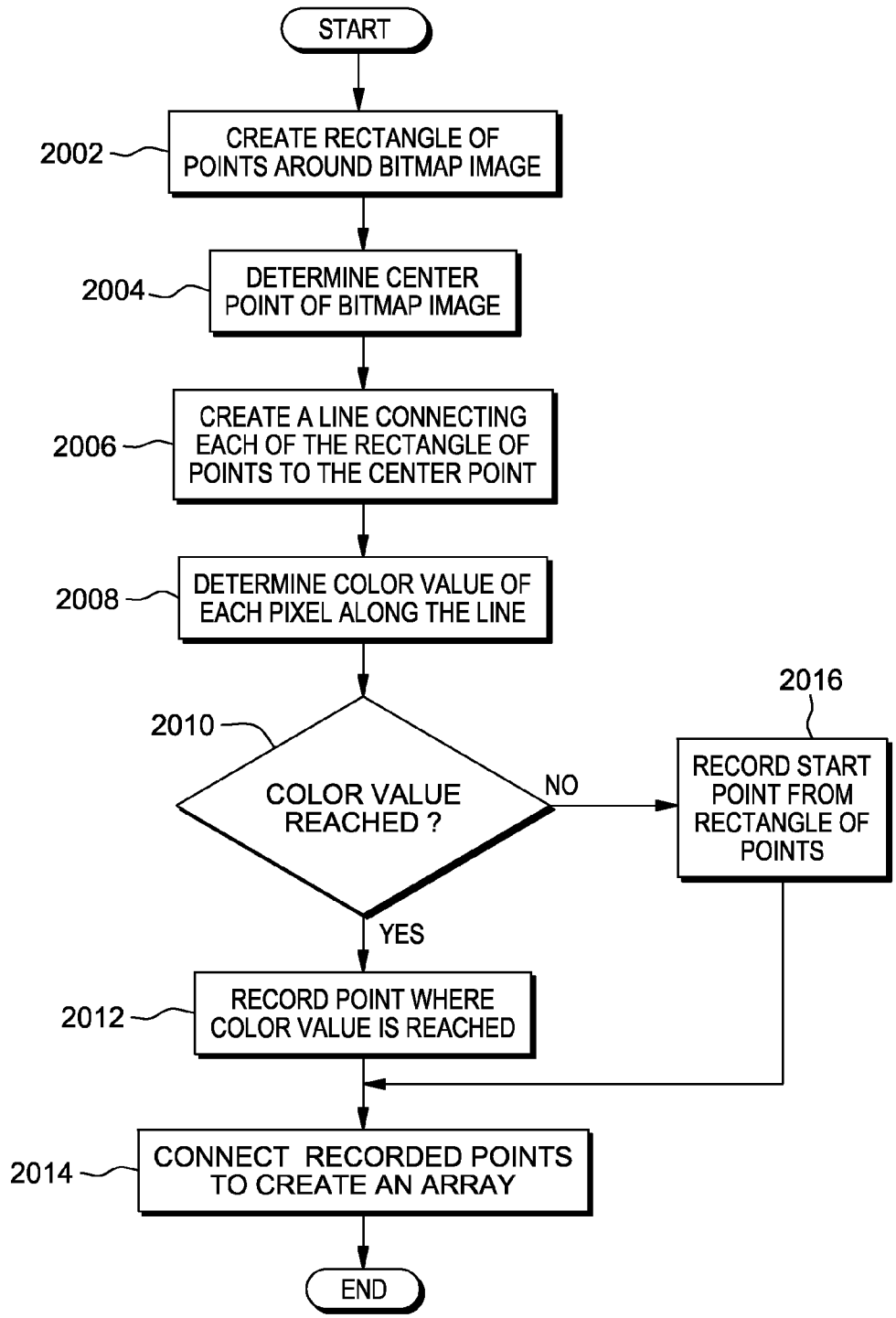
FIG. 20 is a flowchart that illustrates the steps of creating an image mask for the first bitmap image, in accordance with an embodiment of the invention.

FIG. 20 is a flowchart that illustrates the steps of image mask 126 in creating an image mask for a bitmap image, in accordance with an embodiment of the invention. In a preferred embodiment, image mask 126 creates a rectangle of points around a bitmap image (step 2002). In the preferred embodiment, each side of the rectangle of points contains 8 to 10 points. Image mask 126 then determines the center point of the bitmap image (step 2004). Image mask 126 then creates a line from each of the rectangle of points to the center point of the bitmap image (step 2006).

For example, with regard to FIG. 19, image mask 126 creates rectangle of points around bitmap image 1902. Using the rectangle of points, image mask 126 calculates the center point of bitmap image 1902. Image mask 126 then creates a line from each point of the rectangle of points to the calculated center point of bitmap image 1902.

Image mask 126 then travels along each newly created line, pixel by pixel, determining the color value of each pixel along the line (step 2008). Image mask 126 continues to check the color value of each pixel along each line until a pixel with a color value of 240, 240, 240 or below is encountered (determination 2010). A color value consists of three numbers representing a blue, red and green value, respectively. The color value 255, 255, 255 represents white; however, there are pixels with color values that fall below 255, 255, 255 that are a non-visible off-white that still appear white to the naked eye. To compensate for this, in a preferred embodiment, image mask 126 continues to check the color value of each pixel along the line until a pixel with a color value of 240, 240, 240 or below is reached.

If image mask 126 encounters a pixel along the line with a color value below 240, 240, 240 (determination 2010, "YES" branch), image mask 126 records the point for a final point array (step 2012). If image mask 126 reaches the center point of the bitmap image without encountering a pixel with a color value below 240, 240, 240 (determination 2010, "NO" branch), image mask 126 records the starting point from the rectangle of points for the final point array (step 2016). Image mask 126 then connects each recorded point to create a polygon shape which serves as a line anchor, i.e., an image mask, for lines connecting to the bitmap image (step 2014).

For example, with regard to FIG. 19, image mask 126 travels pixel by pixel from each point of the rectangle of points to the calculated center point of bitmap image 1902. Image mask 126 checks the color value of each pixel until the color value drops below 240, 240, 240. Once a pixel with a color value below 240, 240, 240 is reached, image mask 126 records the point for a final point array and creates a polygon by connecting all the recorded points. The polygon acts as an image mask for bitmap image 1902.

Figure 21:
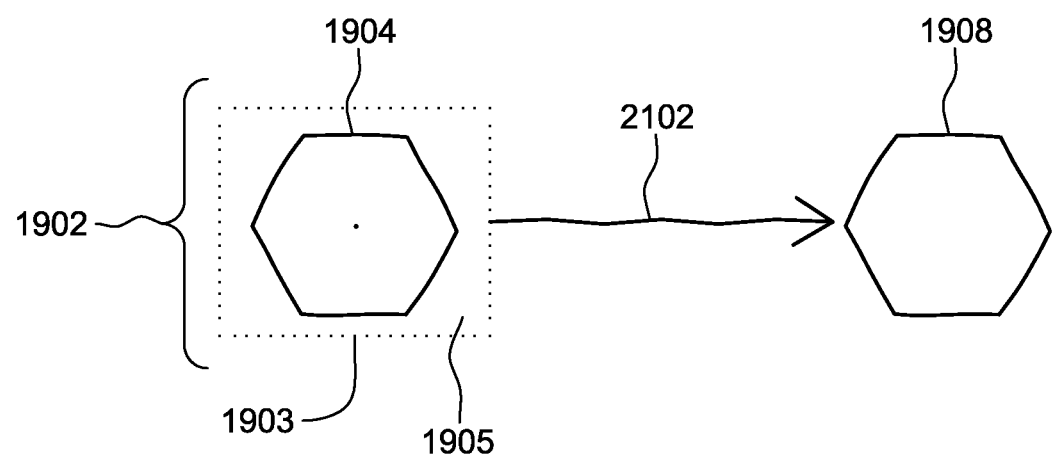
FIG. 21 illustrates the first bitmap image with an image mask connected to a second bitmap image by a line, in accordance with an embodiment of the invention.

FIG. 21 illustrates bitmap image 1902, with an image mask, created by image mask 126 connected to a second bitmap image by a line, in accordance with an embodiment of the invention. The newly created image mask around bitmap image 1902 acts as a new line anchor for sketch line 2102 so that sketch line 2102 doesn't appear disconnected from sketch shape 1904, as in FIG. 19.

Figure 22:
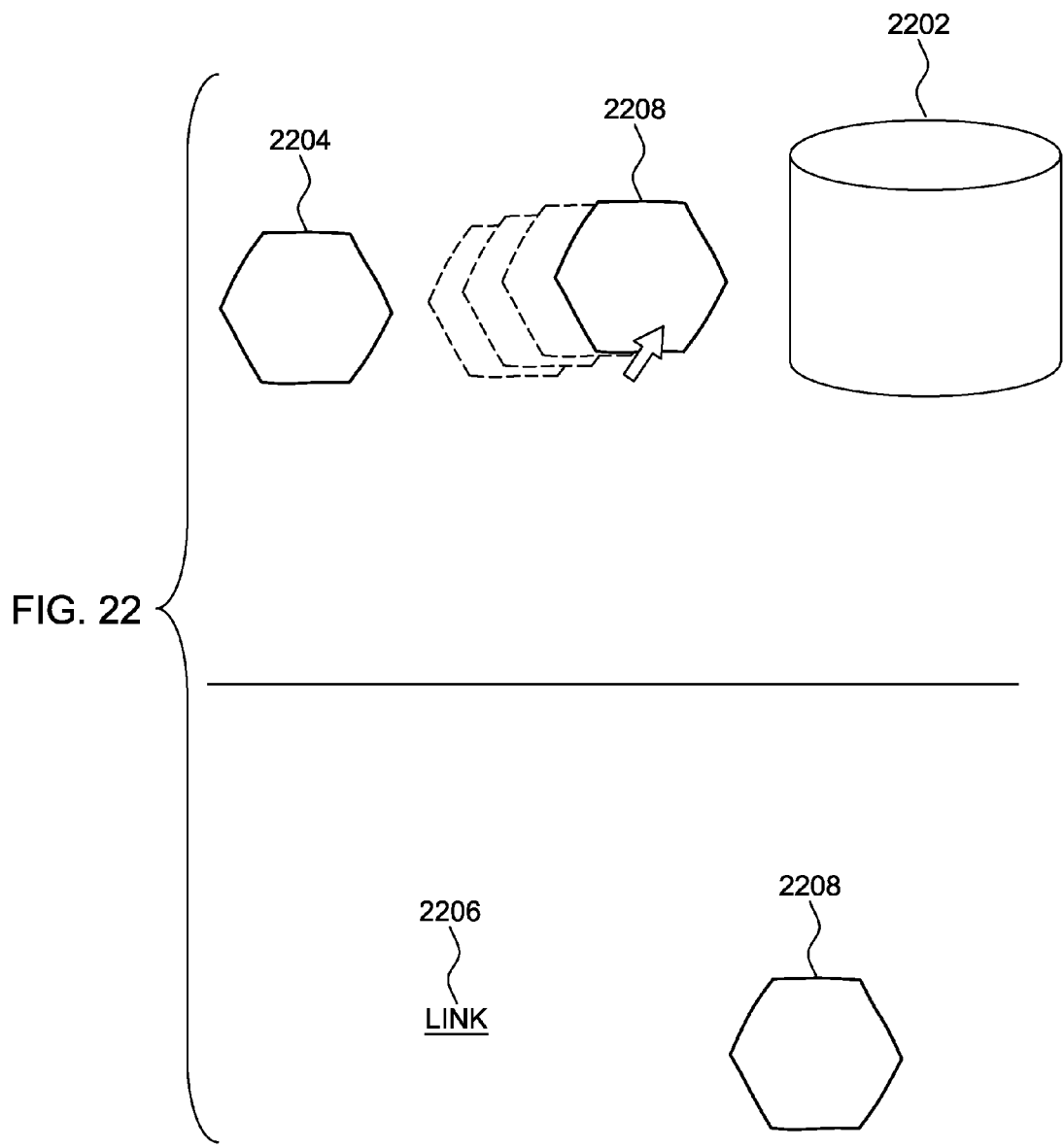
FIG. 22 illustrates a sketch shape being moved into a second sketch file via a sketch file shape, in accordance with an embodiment of the invention.

FIG. 22 illustrates sketch file shape 2202, which in a preferred embodiment, is provided as a selectable icon by image mask 126 and serves as a sketch shape representation of a second sketch file. Sketch file shape 2202 allows a user to move sketch shapes to a separate sketch file by dragging and dropping sketch shapes into sketch file shape 2202. In an exemplary embodiment, a user selects a sketch file shape icon from a toolbar and places sketch file shape 2202 into a first sketch file, which initially contains sketch shape 2204 and sketch shape 2208. Sketch shape 2208 is then dragged and dropped into sketch file shape 2202, which results in sketch shape 2208 being moved into a second sketch file. The user can click on sketch file shape 2202 to quickly open the second sketch file. Image mask 126 provides a return link, link 2206, in the second sketch file so the user can easily return to the first sketch file. The user can also delete or rename the second sketch file by renaming sketch file shape 2202.

Figure 23:
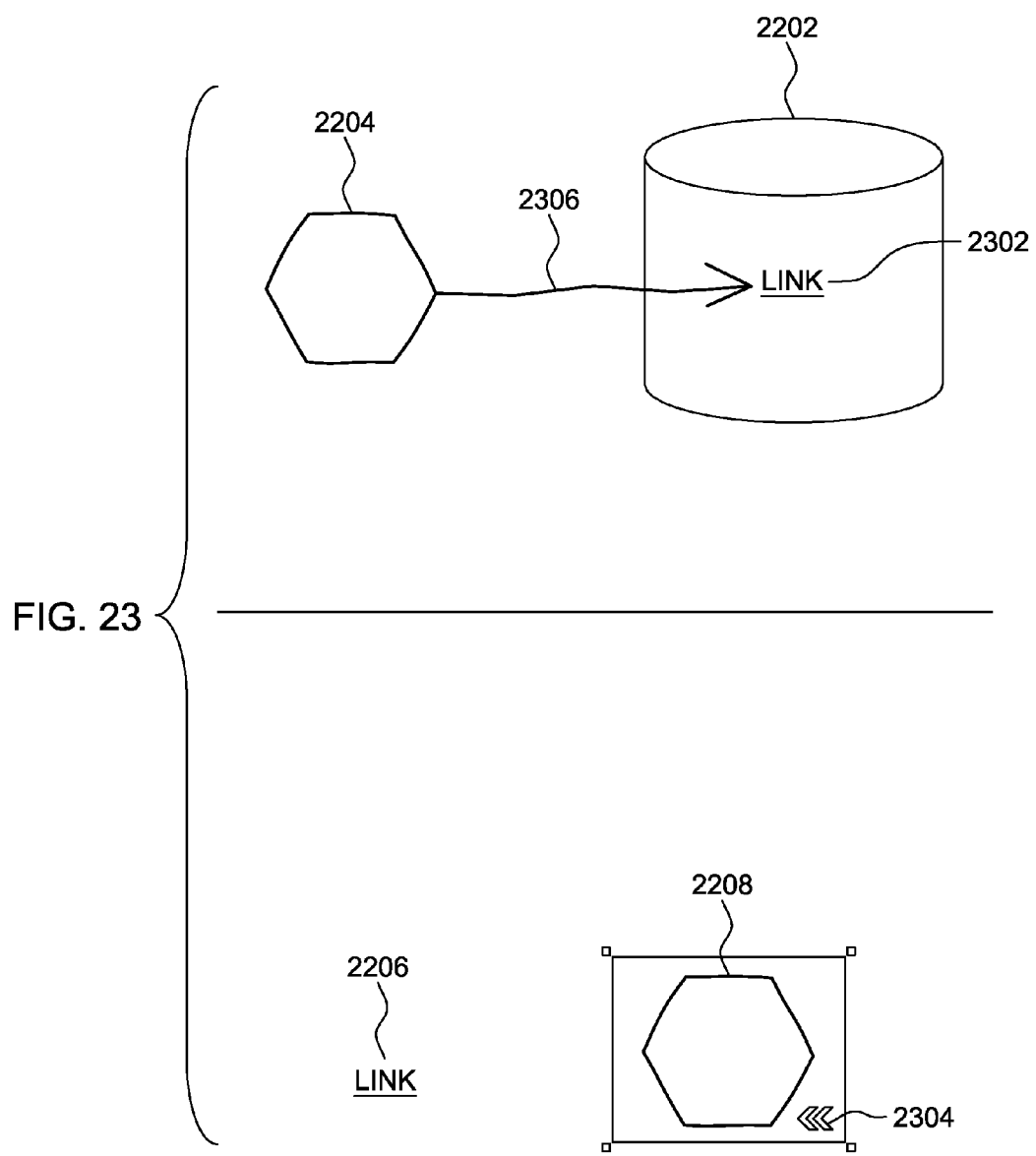
FIG. 23 illustrates a sketch shape connected to a second sketch shape via a sketch file shape, in accordance with an embodiment of the invention.

Image mask 126 also maintains a connection between two sketch shapes if one of them is subsequently moved from a first sketch file to a second sketch file by dragging and dropping the sketch shape into sketch file shape 2202. FIG. 23 illustrates sketch file shape 2202 maintaining a sketch line connection between sketch shape 2204 and sketch shape 2208 after sketch shape 2208 is subsequently dragged and dropped in a second sketch file via sketch file shape 2202. In an exemplary embodiment, a user drags and drops sketch shape 2208 in sketch file shape 2202, sending sketch shape 2208 to a second sketch file. Image mask 126 maintains the sketch line connection between the two sketch shapes by adding link 2302 inside of sketch shape 2202, and creating a sketch line, i.e., sketch line 2306, from sketch shape 2204 to link 2302. When link 2302 is selected, the second sketch file opens and sketch shape 2208 is highlighted, exemplifying that the sketch shape 2204 is still connected to sketch shape 2208 via link 2302. Link 2304, is also created by image mask 126 and attached to sketch shape 2208. When selected, link 2304 returns the user back to the first sketch file and highlights link 2302, to further display that there is a sketch line connection between sketch shape 2204 and sketch shape 2208. Once again, link 2206 serves as a return link, which when selected, returns the user back to the first sketch file.

Figure 24:
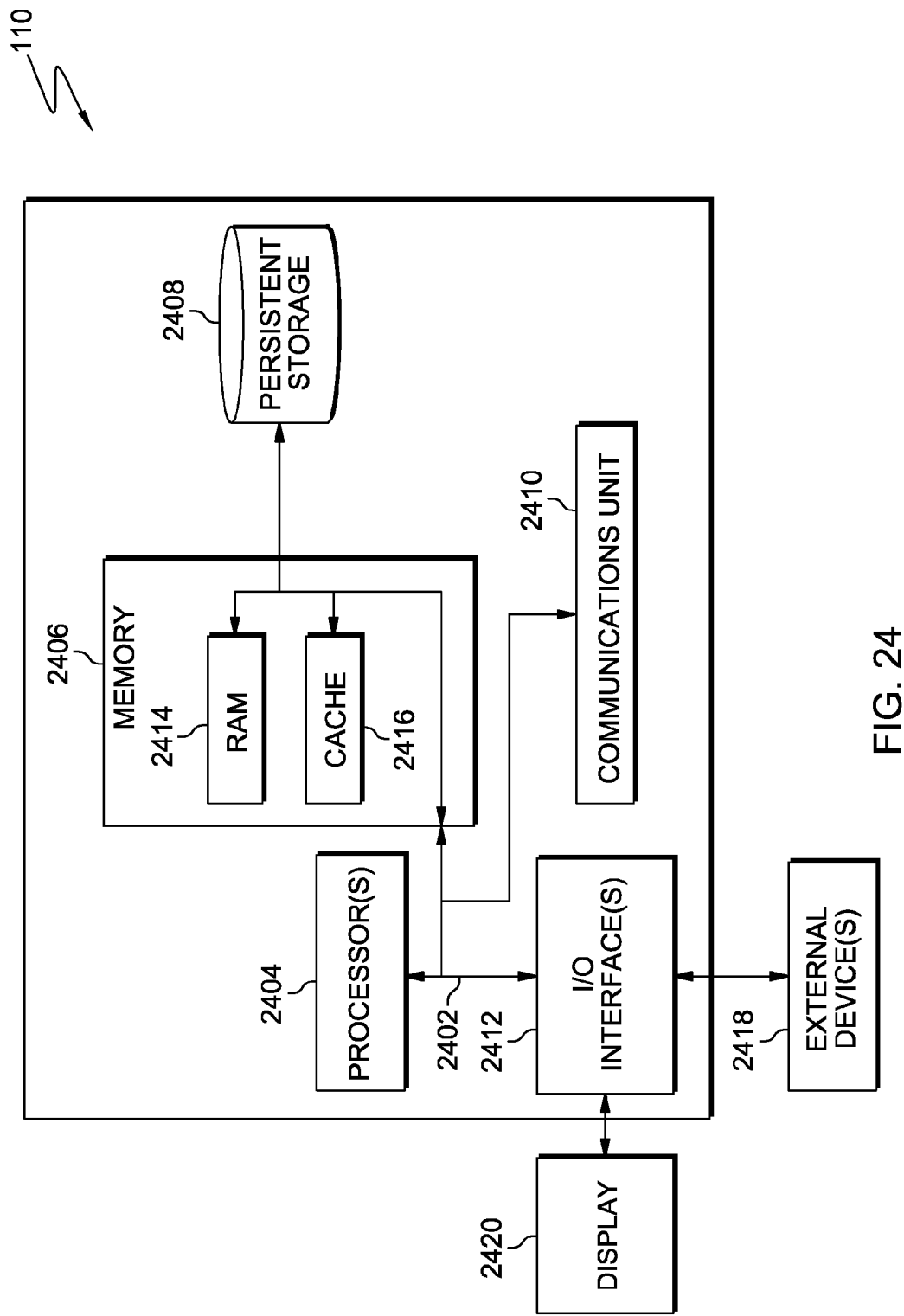
FIG. 24 is a block diagram depicting the components of a computer having the semantic editor add-on of FIG. 1, in accordance with an embodiment of the invention.

FIG. 24 depicts a block diagram of components of computing device 110 in accordance with an illustrative embodiment. It should be appreciated that FIG. 24 provides only an illustration of one implementation and does not imply any limitations with regard to the environment in which different embodiments may be implemented. Many modifications to the depicted environment may be made.

Computing device 110 includes communications fabric 2402, which provides communications between computer processor(s) 2404, memory 2406, persistent storage 2408, communications unit 2410, and input/output (I/O) interface(s) 2412.

Memory 2406 and persistent storage 2408 are examples of computer-readable tangible storage devices and media. Memory 2406 may be, for example, one or more random access memories (RAM) 2414, cache memory 2416, or any other suitable volatile or non-volatile storage device.

Image mask 126, semantic editor 112, and user interface 116 are stored in persistent storage 2408 for execution by one or more of the respective computer processors 2404 via one or more memories of memory 2406. In the embodiment illustrated in FIG. 24, persistent storage 2408 includes flash memory. Alternatively, or in addition to flash memory, persistent storage 2408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 2408 may also be removable. For example, a removable hard drive may be used for persistent storage 2408. Other examples include an optical or magnetic disk that is inserted into a drive for transfer onto another storage device that is also a part of persistent storage 2408, or other removable storage devices such as a thumb drive or smart card.

Communications unit 2410, in these examples, provides for communications with other data processing systems or devices. In these examples, communications unit 2410 includes one or more network interface cards. Communications unit 2410 may provide communications through the use of either or both physical and wireless communications links. Semantic editor add-on 114, semantic editor 112, and user interface 116 may be downloaded to persistent storage 2408 through communications unit 2410.

I/O interface(s) 2412 allows for input and output of data with other devices that may be connected to computing device 110. For example, I/O interface 2412 may provide a connection to external devices 2418 such as a keyboard, keypad, a touch screen, and/or some other suitable input device. I/O interface(s) may also connect to display 2420.

Display 2420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for converting a sketch shape into a semantic element, the method comprising the steps of:
    receiving a request to convert a first sketch shape into a first semantic element, wherein the first sketch shape and a second semantic element are part of a first nested shape combination, wherein the first sketch shape includes a visual depiction corresponding to a first class of semantic descriptions, wherein the first semantic element is a visual depiction further including a first semantic description of the first class of semantic descriptions;
    determining that a first semantic relationship between the first semantic element and the second semantic element exists; and
    based on determining the first semantic relationship converting the first sketch shape to the first semantic element, such that the determined first semantic relationship is depicted between the second semantic element and first semantic element;
    wherein at least one of the steps is carried out using a computing device.

2. The method of claim 1, further comprising the steps of:
    determining that a second semantic relationship between the second semantic element and the first semantic element exists;
    displaying the first and second semantic relationships that exist between the second semantic element and the first semantic element; and
    receiving input selecting the first semantic relationship.

3. The method of claim 1, wherein the step of determining that the first semantic relationship between the first semantic element and the second semantic element exist further comprises:
    determining that the first semantic relationship between the second semantic element and the first semantic element can be depicted upon receipt of prerequisite information;
    requesting the prerequisite information; and
    receiving the prerequisite information.

4. The method of claim 1, further comprising the steps of:
    receiving a request to convert a second sketch shape into a third semantic element, wherein the second sketch shape and a fourth semantic element are part of a second nested shape combination;
    determining no semantic relationship between the fourth semantic element and the third semantic element exists;
    separating the second sketch shape from the fourth semantic element so there is no containment, creating a separated second sketch shape and a separated fourth semantic element;
    converting the second sketch shape to the third semantic element; and
    depicting a line between the fourth semantic element and the third semantic element.

5. The method of claim 4, further comprising the step of:
    creating a third sketch shape that surrounds the separated fourth semantic element and third semantic element.

6. The method of claim 1, wherein the first nested shape combination comprises the first sketch shape contained within the second semantic element.

7. The method of claim 1, wherein the second nested shape combination comprises the second sketch shape contained within the fourth semantic element.

8. The method of claim 1, wherein the first nested shape combination comprises the first sketch shape containing the second semantic element.

9. The method of claim 1, wherein the second nested shape combination comprises the second sketch shape containing the fourth semantic element.

10. The method of claim 1, wherein the first nested shape combination comprises the first sketch shape containing multiple semantic elements.

11. The method of claim 1, wherein the second nested shape combination comprises the second sketch shape containing multiple semantic elements.

12. The method of claim 1, wherein the first nested shape combination comprises the first sketch shape containing the second semantic element and being contained by a fifth semantic element.

13. The method of claim 1, wherein the second nested sketch combination comprises the second sketch shape containing the fourth semantic element and being contained by a sixth semantic element.

14. A method for converting a sketch shape to a semantic element, the method comprising the steps of:

receiving input defining a first name for a first sketch shape, wherein the first sketch shape includes a visual depiction corresponding to a first class of semantic descriptions, and wherein the visual depiction does not have a specific semantic definition;

receiving a request to convert the first sketch shape to a semantic element, wherein the semantic element is a visual depiction further including a first semantic description of the first class of semantic descriptions;

searching for a semantic element stored in correlation with a subset of the first name;

responsive to not finding a semantic element stored in correlation with the subset of the first name, displaying a plurality of semantic elements;

receiving input indicating a displayed semantic element to be correlated with the subset of the first name;

storing the correlation between the indicated semantic element and the subset of the first name; and converting the first sketch shape into the indicated semantic element;

wherein at least one of the steps is carried out using a computing device.

15. The method of claim 14, further comprising the steps of:

receiving input defining a name containing the subset of the first name for a second sketch shape;

receiving a request to convert the second sketch shape to a semantic element;

searching for a semantic element stored in correlation with the subset; and responsive to finding the indicated semantic element stored in correlation with the subset, displaying a plurality of semantic elements which presents the indicated semantic element more prominently than other semantic elements.

16. The method of claim 14, further comprising the steps of:

receiving input adding a first description for the first sketch shape;

receiving a request to convert the first description to a semantic property;

searching for a semantic property stored in correlation with a subset of the first description;

responsive to not finding a semantic property stored in correlation with the subset of the first description, displaying a plurality of semantic elements;

receiving input indicating a displayed semantic property to be correlated with the subset of the first description;

storing the correlation between the indicated semantic property and the subset of the first description; and converting the first description to the indicated semantic property.

17. The method of claim 16, further comprising the steps of:

receiving input adding a second description containing the subset of the first description to a second sketch shape;

receiving a request to convert the second description to a semantic property;

searching for a semantic property stored in correlation with the subset; and responsive to finding the indicated semantic property that correlates with the subset, displaying a plurality of semantic properties which presents the correlating semantic property more prominently than other semantic properties.

18. A method of converting one or more sketch shapes into a pre-defined set of semantic elements, the method comprising the steps of:

receiving a request to convert one or more sketch shapes into a semantic template containing a pre-defined set of semantic elements, wherein the one or more sketch shapes includes a visual depiction corresponding to the pre-defined set of semantic elements, and wherein the visual depiction does not have a specific semantic definition;

receiving input mapping each sketch shape from the one or more sketch shapes to a separate respective semantic element from the semantic template;

converting each sketch shape to respective mapped semantic element from the semantic template;

creating each semantic element from the semantic template that is not mapped to a sketch shape; and creating a semantic relationship between two or more created semantic elements, if the semantic relationship existed between the two or more created semantic elements in the semantic template;

wherein at least one of the steps is carried out using a computing device.

19. The method of claim 1, wherein determining that a first semantic relationship between the first semantic element and the second semantic element exists comprises searching a database for saved semantic relationships between the first semantic element and the second semantic element.

20. The method of claim 19, wherein searching a database for saved semantic relationships between the first semantic element and the second semantic element comprises finding a possible semantic element that has a requirement property that matches a capability property of the second semantic element.

* * * * *